(12) United States Patent
Aguiar et al.

(10) Patent No.: US 12,067,786 B2
(45) Date of Patent: *Aug. 20, 2024

(54) SYSTEMS AND METHODS FOR VALIDATING SENSOR CALIBRATION

(71) Applicant: Motional AD LLC, Boston, MA (US)

(72) Inventors: Mauro Aguiar, Salem, MA (US); Noam Weinstein, Cambridge, MA (US); Eric Wolff, Cambridge, MA (US); Matthias Sapuan, Singapore (SG); Hsun-Hsien Chang, Brookline, MA (US); Philipp Robbel, Cambridge, MA (US); Maurilio Di Cicco, Singapore (SG); Guchan Ozbilgin, Pittsburgh, PA (US); Bishwamoy Sinha Roy, Pittsburgh, PA (US); Yifan Yang, Pittsburgh, PA (US); Akshay Bhagat, Squirrel Hill, PA (US); David Butterworth, Pittsburgh, PA (US); Andrew J. Eick, Pittsburgh, PA (US); Alok Sharma, Pittsburgh, PA (US); Junqing Wei, Bridgeville, PA (US)

(73) Assignee: Motional AD LLC, Boston, MA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/888,563

(22) Filed: Aug. 16, 2022

(65) Prior Publication Data

US 2022/0392232 A1    Dec. 8, 2022

Related U.S. Application Data

(63) Continuation of application No. 16/695,291, filed on Nov. 26, 2019, now Pat. No. 11,443,524.

(Continued)

(51) Int. Cl.
*G06V 20/58* (2022.01)
*F21V 8/00* (2006.01)
(Continued)

(52) U.S. Cl.
CPC .......... *G06V 20/58* (2022.01); *G02B 6/0055* (2013.01); *G05D 1/0088* (2013.01); *G06T 7/80* (2017.01)

(58) Field of Classification Search
CPC .... G06V 20/58; G02B 6/0055; G05D 1/0088; G06T 7/80; G01S 7/4972; G01S 7/4802; G01S 17/86; G01S 17/89
See application file for complete search history.

(56) References Cited

U.S. PATENT DOCUMENTS 9,719,801 B1    8/2017    Ferguson et al.
9,734,419 B1    8/2017    Ye et al.
(Continued)

FOREIGN PATENT DOCUMENTS

CN    105551039    5/2016
CN    106228537    12/2016
(Continued)

OTHER PUBLICATIONS

Iyer et al., "CalibNet: Self-Supervised Extrinsic Calibration using 3D Spatial Transformer Networks," submitted on Mar. 22, 2018, arXiv:1803.08181, 8 pages.
(Continued)

*Primary Examiner* — Santiago Garcia
(74) *Attorney, Agent, or Firm* — Fish & Richardson P.C.

(57) ABSTRACT

Among other things, we describe systems and method for validating sensor calibration. For validating calibration of a system of sensors having several types of sensors, an object may be configured to have a substantially reflective portion such that the sensors can isolate the substantially reflective
(Continued)

portion, and their sensor data can be compared to determine, if the detected locations of the substantially reflective portion by each sensor are aligned. For calibrating a system of sensors, an object having known calibration features can be used and detected by each sensor, and the detected data can be compared to known calibration data associated with the object to determine if each sensor is correctly calibrated.

20 Claims, 19 Drawing Sheets

Related U.S. Application Data

(60) Provisional application No. 62/777,637, filed on Dec. 10, 2018.

(51) Int. Cl.
  G05D 1/00 (2024.01)
  G06T 7/80 (2017.01)

(56) References Cited

U.S. PATENT DOCUMENTS

| | | | |
|---|---|---|---|
| 10,269,141 | B1 | 4/2019 | Shotan |
| 11,443,524 | B2 | 9/2022 | Aguiar et al. |
| 11,609,574 | B2 | 3/2023 | Walters et al. |
| 2002/0072869 | A1 | 6/2002 | Stiller |
| 2009/0045323 | A1* | 2/2009 | Lu ............................ B60R 1/00 250/208.1 |
| 2010/0157280 | A1 | 6/2010 | Kusevic et al. |
| 2011/0157373 | A1 | 6/2011 | Ye |
| 2014/0333729 | A1 | 11/2014 | Pflug |
| 2016/0029017 | A1* | 1/2016 | Liang ................... H04N 17/002 348/175 |
| 2016/0129917 | A1 | 5/2016 | Gariepy et al. |
| 2017/0008521 | A1* | 1/2017 | Braunstein .............. G06F 16/29 |
| 2017/0261600 | A1 | 9/2017 | Maennicke et al. |
| 2017/0287166 | A1 | 10/2017 | Claveau et al. |
| 2018/0012082 | A1* | 1/2018 | Satazoda ............. G06V 10/763 |
| 2018/0086284 | A1 | 3/2018 | Gupta et al. |
| 2018/0180723 | A1 | 6/2018 | Sebastian et al. |
| 2018/0196127 | A1* | 7/2018 | Harada ................... G01S 7/497 |
| 2018/0232947 | A1 | 8/2018 | Nehmadi et al. |
| 2018/0299534 | A1 | 10/2018 | LaChapelle et al. |
| 2018/0356526 | A1 | 12/2018 | Wang et al. |
| 2019/0012808 | A1 | 1/2019 | Mou |
| 2019/0052851 | A1* | 2/2019 | Korl ...................... H04N 9/3194 |
| 2019/0065863 | A1 | 2/2019 | Luo et al. |
| 2019/0116354 | A1 | 4/2019 | Yao et al. |
| 2019/0120948 | A1 | 4/2019 | Yang et al. |
| 2019/0204425 | A1* | 7/2019 | Abari .................... G05D 1/0011 |
| 2019/0265712 | A1* | 8/2019 | Satzoda ................. B60W 40/09 |
| 2019/0293772 | A1* | 9/2019 | Pfeiffer .................. G05D 1/024 |
| 2019/0329782 | A1* | 10/2019 | Shalev-Shwartz ........................... G01C 21/3407 |
| 2019/0339687 | A1 | 11/2019 | Cella et al. |
| 2020/0005489 | A1* | 1/2020 | Kroeger ................... G06T 7/85 |
| 2020/0150677 | A1* | 5/2020 | Walters ................ G05D 1/0225 |
| 2020/0174107 | A1 | 6/2020 | Briggs et al. |
| 2020/0184236 | A1 | 6/2020 | Aguiar et al. |
| 2020/0226794 | A1* | 7/2020 | Sugio ...................... G01S 17/06 |
| 2021/0056713 | A1 | 2/2021 | Rangesh et al. |
| 2021/0390331 | A1* | 12/2021 | Kellner .................. G01S 7/411 |

FOREIGN PATENT DOCUMENTS

| | | |
|---|---|---|
| CN | 107167826 | 9/2017 |
| CN | 109300162 | 2/2019 |
| CN | 109754426 | 5/2019 |
| CN | 109813335 | 5/2019 |
| DE | 102017205727 | 10/2018 |
| EP | 3109667 | 12/2016 |
| EP | 3158293 | 1/2019 |
| EP | 3438776 | 2/2019 |
| EP | 3438777 | 2/2019 |
| EP | 3637142 | 4/2020 |
| EP | 3815045 | 5/2021 |
| GB | 201219850 | 12/2012 |
| WO | WO 2016153224 | 9/2016 |
| WO | WO 2018138584 | 8/2018 |
| WO | WO 2018184829 | 10/2018 |
| WO | WO 2018196001 | 11/2018 |
| WO | WO 2019018315 | 1/2019 |
| WO | WO 2019079211 | 4/2019 |
| WO | WO 2019136479 | 7/2019 |
| WO | WO 2020006378 | 1/2020 |

OTHER PUBLICATIONS

Levinson et al., "Automatic Online Calibration of Cameras and Lasers," Robotics: Science and Systems, Jun. 24, 2013, 2(7), 8 pages.

DK Office Action in Danish Appln No. PA2019-70164, dated Nov. 15, 2019, 9 pages.

DK Second Office Action in Danish Appln No. PA2019-70164, dated Sep. 21, 2020, 3 pages.

DK Third Technical Examination in Danish Appln. No. PA2019-70164, Dec. 9, 2020, 8 pages.

Opromolla et al., "Laboratory test of pose determination algorithm for uncooperative spacecraft," 2017 IEEE International Workshop on Metrology for AeroSpace (MetroAeroSpace), Jun. 21, 2017, pp. 169-174.

PCT International Preliminary Report on Patentability in International Appln. No. PCT/IB2019/060180, dated Jun. 24, 2021, 10 pages.

PCT International Search Report and Written Opinion in International Appln. No. PCT/IB2019/060180, dated Apr. 2, 2020, 12 pages.

SAE, "Surface Vehicle Recommended Practice", SAE International's standard J3016: Taxonomy and Definitions for Terms Related to On-Road Motor Vehicle Automated Driving Systems, 30 pages, Sep. 2016.

Verma et al., "Automatic Extrinsic Calibration Between a Camera and a 3D Lidar using 3D Point and Plane Correspondences," CoRR, Submitted on Apr. 29, 2019, arXiv:1904.12433v1, 7 pages.

Xue et al., "Target object size and orientation recognition based on 3D point cloud Euclidean clustering and RANSAC boundary fitting," Mechanical Design and Research, 2018, 34(5)44-48+53 (Abstract Only).

Zhou et al.,"A New Minimal Solution for the Extrinsic Calibration of a 2D Lidar and a Camera Using Three Plane-Line Correspondences," IEEE Sensors Journal, Feb. 2014, 14(2):442-454.

* cited by examiner

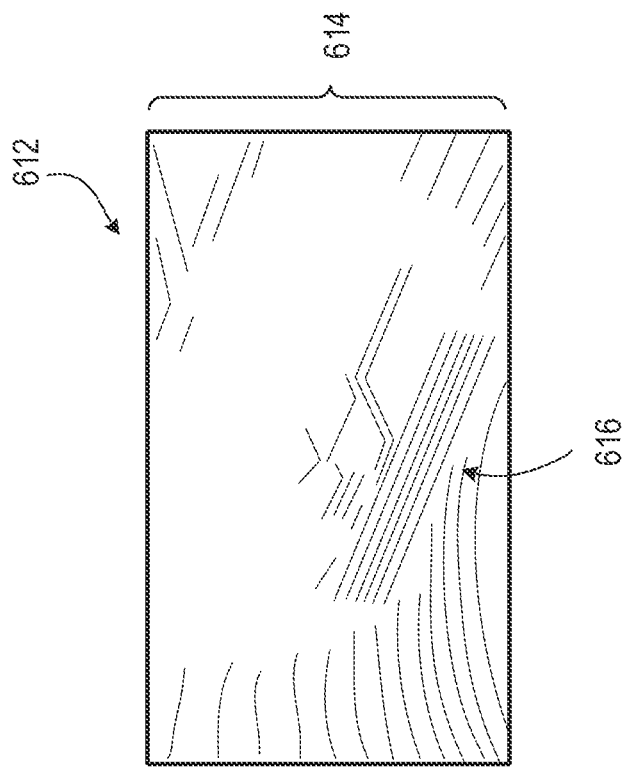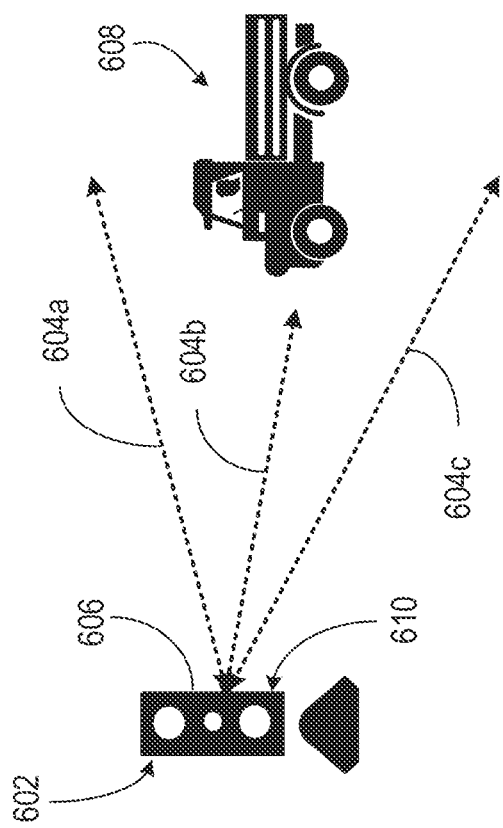
FIG. 6

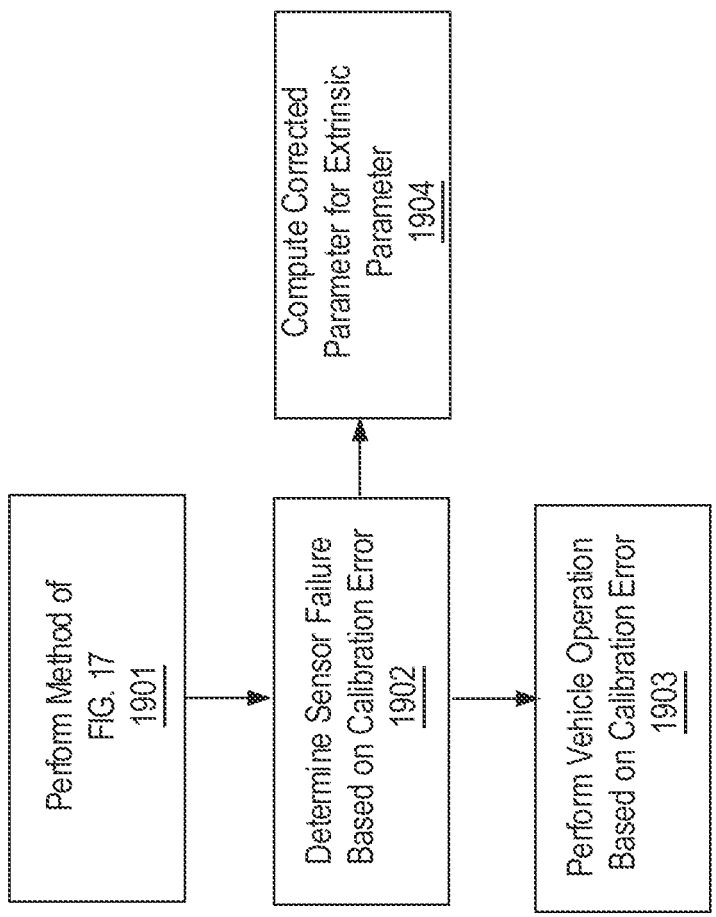

SYSTEMS AND METHODS FOR VALIDATING SENSOR CALIBRATION

CROSS-REFERENCE TO RELATED APPLICATION

This application is a continuation of U.S. application Ser. No. 16/695,291, filed Nov. 26, 2019, which claims the benefit of U.S. Provisional Application No. 62/777,637, filed on Dec. 10, 2018, both of which are incorporated herein by reference in its entirety.

FIELD OF THE INVENTION

This disclosure generally relates to validating sensor calibration. In particular, this description relates to systems and methods for providing automated validation of sensor calibration.

BACKGROUND

It is becoming popular to configure vehicles such that they have autonomous navigation capabilities. For example, drones and self-driving cars can be configured to autonomously navigate throughout an environment. These vehicles may rely on sensors such as light detection and ranging sensors, RADAR, and vision based sensors to assist them in navigating within an environment. Many of these autonomous vehicles use multiple sensor types simultaneously. Furthermore, the position of these sensors as they are mounted on the autonomous vehicle can change slightly due to, for example, vibrations of the vehicle while the vehicle is traversing a road. This may have a negative effect on the sensors' calibration.

SUMMARY

In at least one aspect of the present disclosure, a system for validating sensor calibration is provided. The system includes at least one object configured to have a substantially reflective portion. The system includes at least one light detection and ranging sensor configured to detect a distance to at least one location associated with the substantially reflective portion of the at least one object. The system includes at least one imaging sensor configured to detect light intensity values associated with the substantially reflective portion of the at least one location of the at least one object. The system includes a computer readable medium storing computer-executable instructions and at least one processor communicatively coupled to the at least one light detection and ranging sensor and the at least one imaging sensor and configured to execute the computer-executable instructions stored on the computer readable medium. When the at least one processor executes to the computer-executable instructions stored on the computer readable medium, the at least one processor carries out operations to: receive sensor data associated with the detected distance to the at least one location; generate a first predicted aggregate location associated with the substantially reflective portion based on the sensor data associated with the detected distance to the at least one location; receive sensor data associated with the detected intensity values of the at least one location; generate a second predicted aggregate location associated with the substantially reflective portion based on the sensor data associated with the detected intensity values of the at least one location; and determine an alignment error value based on the first predicted aggregate location and the second predicted aggregate location.

The computer-executable instructions can include a first algorithm for generating the first predicted aggregate location and a second algorithm for generating the second predicted aggregate location. The second algorithm can be different from the first algorithm. At least one of the first algorithm and the second algorithm can modified when the alignment error value is greater than a first alignment error threshold. At least one of the first algorithm and the second algorithm can be modified such that the generated first predicted aggregate location and the generated second predicted aggregate location are substantially aligned. When the at least one processor executes the instructions, the at least one processor can carry out operations to initiate a calibration process of the at least one image capture sensor or the at least one light detection and ranging sensor when the alignment error is more than a second alignment error threshold.

A substantially non-reflective portion can include a black surface. The substantially reflective portion can include a substantially white surface.

In another aspect of the present disclosure, a method for validating sensor calibration is provided. The method includes configuring at least one object to have a substantially reflective portion. The method includes detecting, with a first sensor, a distance to at least one location associated with the substantially reflective portion of the at least one object. The method includes detecting, with a second sensor, light intensity values of the one or more locations associated with the substantially reflective portion of the at least one object. The method includes receiving sensor data associated with the detected distance to the at least one location. The method includes generating a first predicted aggregate location associated with the substantially reflective portion based on the sensor data associated with the detected distance to the at least one location. The method includes receiving sensor data associated with the detected intensity values of at least one location. The method includes generating a second predicted aggregate location associated with the reflective potion based on the sensor data associated with the detected intensity values of the at least one location and determining an alignment error value based on the first predicted aggregate location and the second predicted aggregate location.

The first predicted aggregate location can be generated using a first algorithm and the second predicted aggregate location can be generated using a second algorithm. The method can further include modifying at least one of the first algorithm and the second algorithm when the alignment error value is greater than a first alignment error threshold. The method can further include modifying at least one of the first algorithm and the second algorithm such that the generated first predicted aggregate location and the generated second predicted aggregate location are substantially aligned. The method can further include calibrating at least one of the at least one image capture sensor and the at least one light detection and ranging sensor when the alignment error is more than a second alignment threshold.

In another aspect of the present disclosure, a system for calibrating sensors is provided. The system includes at least one object comprising at least one calibration feature and a vehicle. The vehicle includes a plurality of sensors configured to detect the at least one calibration feature of the at least one object while the at least one object and the vehicle move relative to each other. Each sensor of the plurality of sensors has a plurality of parameters, wherein the plurality of parameters comprises a plurality of intrinsic parameters and a plurality of extrinsic parameters. The vehicle includes a computer-readable medium storing computer-e xecutable instructions and at least one processor configured to be communicatively coupled to plurality of sensors and execute the instructions stored on the computer-readable medium. When the at least one processor executes the instructions, the at least one processor carries out operations to: receive known calibration feature data associated with the at least one calibration feature; receive, from each sensor of the plurality of sensors, detected feature data associated with the at least one calibration feature; compare the received known feature data with the received detected feature data; generate, for each sensor of the plurality of sensors, a calibration error value based on the comparison of the received known feature data with the received detected feature data; and determine that at least one sensor of the plurality of sensors is incorrectly calibrated when the calibration error value corresponding with the at least one sensor is greater than a first calibration error threshold.

When the at least one processor executes the instructions, the at least one processor can further carry out operations to compute a corrected parameter for at least one intrinsic parameter associated with the at least one sensor determined to be incorrectly calibrated. Computing the corrected parameter can be at least partially based on the determining that the at least one sensor is incorrectly calibrated. When the at least one processor executes the instructions, the at least one processor can further carry out operations to modify the at least one intrinsic parameter based on the corrected parameter.

Each of the plurality of sensors can have at least one intrinsic parameter. When the at least one processor executes the instructions, the at least one processor can further carry out operations to receive intrinsic data corresponding with the at least one intrinsic parameter, and compute a corrected parameter for the at least one intrinsic parameter associated with the at least one sensor determined to be incorrectly calibrated. The computing of the corrected parameter for the at least one intrinsic parameter is at least partially based on the received intrinsic data. The at least one intrinsic parameter can include at least one of: an operating frequency, a field of view, a beam width, a beam power, and a signal-to-noise ratio.

When the at least one processor executes the instructions, the at least one processor can further carry out operations to determine that the at least one sensor determined to be calibrated incorrectly is in a failure state when the calibration error value corresponding with the at least one sensor is greater than a second calibration error threshold. When the at least one processor executes the instructions, the at least one processor can carry out operations to compute a corrected parameter for at least one extrinsic parameter associated with the at least one sensor determined to be in a failure state. The computing of the corrected parameter for the at least one extrinsic parameter can be at least partially based on the determining that the at least one sensor is in a failure state. The at least one extrinsic parameter can include at least one of: the locations of the sensors as it is mounted on the vehicle, the distance of the sensor with respect to the other sensors, the angle of the sensor, the noise level caused by the environment, and the ambient brightness of the environment.

The at least one object can include three surfaces defining three mutually perpendicular planes, each surface of the three surfaces comprising at least one calibration feature. The at least one object can include a fixed road feature.

The plurality of sensors can include a first sensor having a first type and a second sensor having a second type. The plurality of sensors can include at least one RADAR sensor, and the least one object can include an inner metal core being detectable by the at least one RADAR sensor. The plurality of sensors can include at least one light detection and ranging sensor and at least one RADAR sensor, and the at least one object can include an augmented portion. The augmented portion can be substantially detectable by the at least one light detection and ranging sensor and substantially undetectable by the at least one RADAR sensor.

The known feature data can include at least one of: information received from a remote sensor, information received from the one or more sensors at a prior time, and information determined by a pre-calibrated sensor of the one or more sensors. The known feature data can include information received from a remote sensor mounted on a second vehicle. The known feature data can include information received from a sensor of a first type and the plurality of sensors can include at least one sensor of a second type being different from the first type.

When the at least one processor executes the instructions, the at least one processor can carry out operations to cause the vehicle to cease operation if the calibration error value corresponding with the at least one sensor determined to be incorrectly calibrated is greater than a calibration error threshold. When the at least one processor executes the instructions, the at least one processor can carry out operations to notify a remote technician if the calibration error value corresponding with the at least one sensor determined to be incorrectly calibrated is greater than a calibration error threshold. When the at least one processor executes the instructions, the at least one processor carries out operations to navigate the vehicle to a service location if the calibration error value corresponding with the at least one sensor determined to be incorrectly calibrated is greater than a calibration error threshold. When the at least one processor executes the instructions, the at least one processor can carry out operations to disable the at least one sensor determined to be incorrectly calibrated if the calibration error value corresponding with the at least one sensor is greater than a calibration error threshold.

In another aspect of the present disclosure, a method for calibrating sensors is provided. The method includes moving a vehicle and at least one object relative to each other, the vehicle including a plurality of sensors and the at least one object comprising at least one calibration feature. The method includes detecting, with the plurality of sensors, the at least one calibration feature of the at least one object while the at least one object and the vehicle are moving relative to each other, each sensor of the plurality of sensors having a plurality of parameters, the plurality of parameters including a plurality of intrinsic parameters and a plurality of extrinsic parameters. The method includes receiving known calibration feature data associated with the at least one calibration feature. The method includes receiving, from each sensor of the plurality of sensors, detected feature data associated with the at least one calibration feature. The method includes comparing the received known feature data with the received detected feature data. The method includes generating, for each sensor of the plurality of sensors, a calibration error value based on the comparison of the received known feature data with the received detected feature data. The method includes determining that at least one sensor of the plurality of sensors is incorrectly calibrated when the calibration error value corresponding with the at least one sensor is greater than a first calibration error threshold.

The method can further include computing a corrected parameter for at least one intrinsic parameter associated with the at least one sensor determined to be incorrectly calibrated. Computing the corrected parameter can be at least partially based on the determining that the at least one sensor is incorrectly calibrated. The method can further include modifying the at least one intrinsic parameter based on the corrected parameter.

Each of the plurality of sensors can include one or more monitoring devices configured to detect intrinsic data corresponding with at least one intrinsic parameter. The method can further include receiving the intrinsic data associated with the at least one intrinsic parameter, and computing a corrected parameter for the at least one intrinsic parameter of the at least one sensor determined to be incorrectly calibrated at least partially based on the received intrinsic data. The method can further include determining that the at least one sensor determined to be incorrectly calibrated is in a failure state when the calibration error value corresponding with the at least one sensor is greater than a second calibration error threshold. The method can further include computing a corrected parameter for at least one extrinsic parameter associated with the at least one sensor determined to be incorrectly calibrated. The computing of the corrected parameter for the at least one extrinsic parameter can be at least partially based on the determining that the at least one sensor is in a failure state.

The at least one object can include three surfaces defining three mutually perpendicular planes, each surface of the three surfaces comprising at least one calibration feature. The at least one object can include a fixed road feature.

The plurality of sensors can include at least one RADAR sensor, and the least one object can include an inner metal core being detectable by the at least one RADAR sensor. The plurality of sensors can include at least one light detection and ranging sensor and at least one RADAR sensor. The at least one object can include an augmented portion, the augmented portion being substantially detectable by the at least one light detection and ranging sensor and substantially undetectable by the at least one RADAR sensor. The known feature data can include information received from a remote sensor, information received from the one or more sensors at a prior time, information determined by a pre-calibrated sensor of the one or more sensors. The known feature data can include information received from a remote sensor mounted on a second vehicle. The known feature data can include information received from a sensor of a first type and the plurality of sensors can include at least one sensor of a second type being different from the first type.

The method can include causing the vehicle to cease operation if the calibration error value corresponding with the at least one sensor determined to be incorrectly calibrated is greater than a calibration error threshold. The method can include notifying a remote technician if the calibration error value corresponding with the at least one sensor determined to be incorrectly calibrated is greater than a calibration error threshold. The method can include navigating the vehicle to a service location if the calibration error value corresponding with the at least one sensor determined to be incorrectly calibrated is greater than a calibration error threshold. The method can include disabling the at least one sensor if the calibration error value corresponding with the at least one sensor determined to be incorrectly calibrated is greater than a calibration error threshold These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 illustrates an example of a LiDAR system.

FIG. 19 is a flowchart depicting a method for determining sensor failure based on calibration error, according to one or more embodiments of the present disclosure.

DETAILED DESCRIPTION

Figure 1:
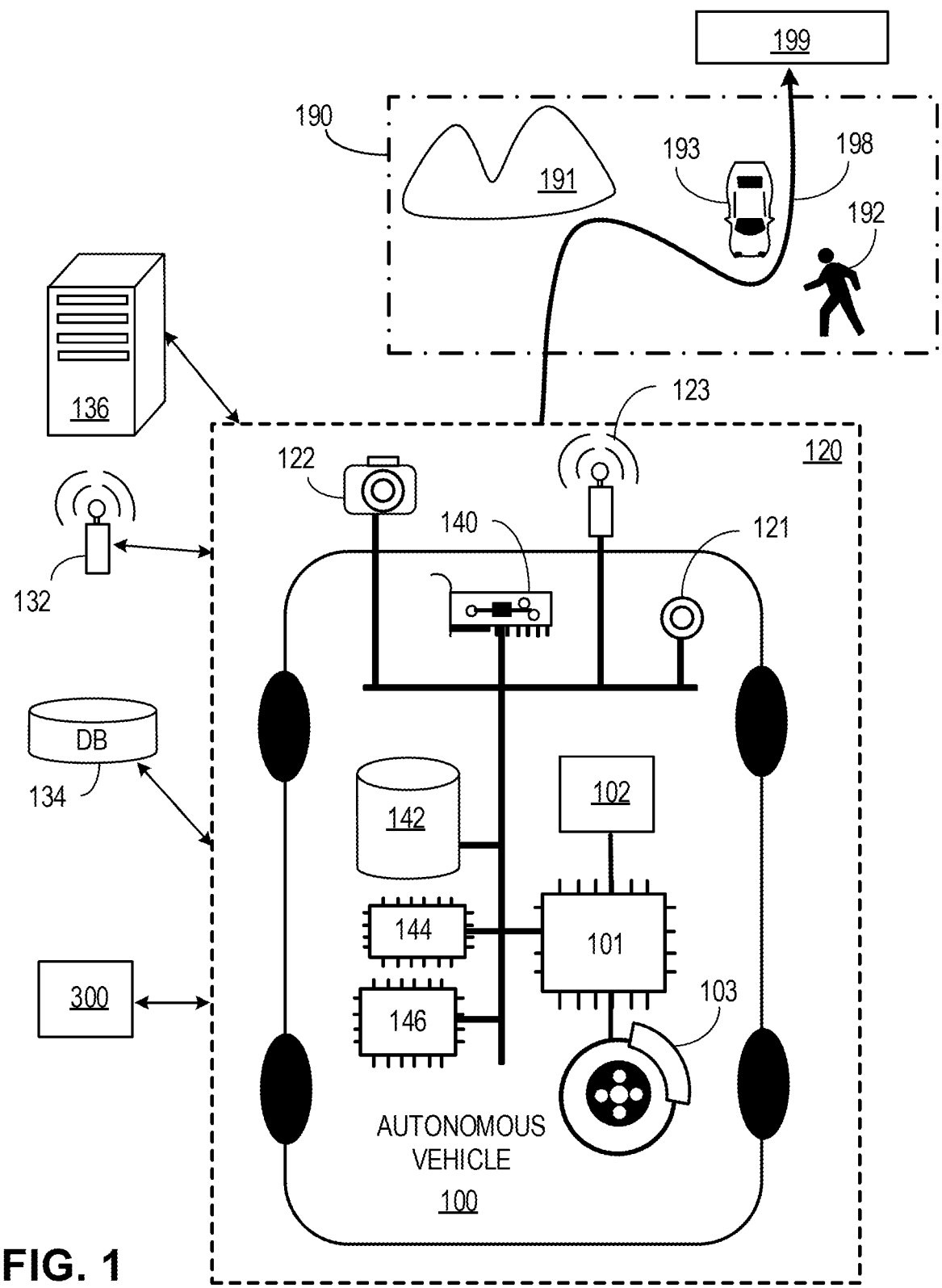
FIG. 1 illustrates an example of an autonomous vehicle having autonomous capability.

In the following description, for the purposes of explanation, numerous specific details are set forth in order to provide a thorough understanding of the present invention. It will be apparent, however, that the present invention may be practiced without these specific details.

In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Systems and Methods for Validating Sensor Calibration
8. Systems and Methods for Validating Sensor Calibration General Overview Among other things, this disclosure describes techniques for automated validation of sensor calibration. The automated validation of sensor calibration may reduce the time needed to ensure that the sensors of an autonomous vehicle are accurate to facilitate safe navigation. The systems and methods make use of the inherent properties of the various sensor types, in order to provide an efficient and accurate technique for each sensor to calibrate itself Vehicles (e.g., drones, self-driving cars, etc.) can be configured to autonomously navigate throughout an environment. These vehicles may rely on sensors such as light detection and ranging sensors, RADAR, and vision based sensors to assist them in navigating within an environment. Many of these autonomous vehicles use multiple sensor types simultaneously. Furthermore, the location of these sensors as they are mounted on the vehicle can change slightly due to, for example, vibrations of the vehicle while the vehicle is traversing a road. This may have a negative effect on the sensors' calibration.

Because these vehicles use multiple sensor types simultaneously, calibration procedures may need to take place to combine the data from different sensors in a common reference frame. Traditional calibration approaches may require manual measurements and inputs. These approaches can be laborious and time consuming, and require the vehicle to be taken out of operation for an extended period of time. Thus, it may be desirable to provide techniques for the vehicle to self-calibrate its sensors in a timely and efficient manner. It may also be desirable to provide techniques for the vehicle to calibrate its sensors while navigating an environment.

System Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including, without limitation, fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV.

In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any level, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates, or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
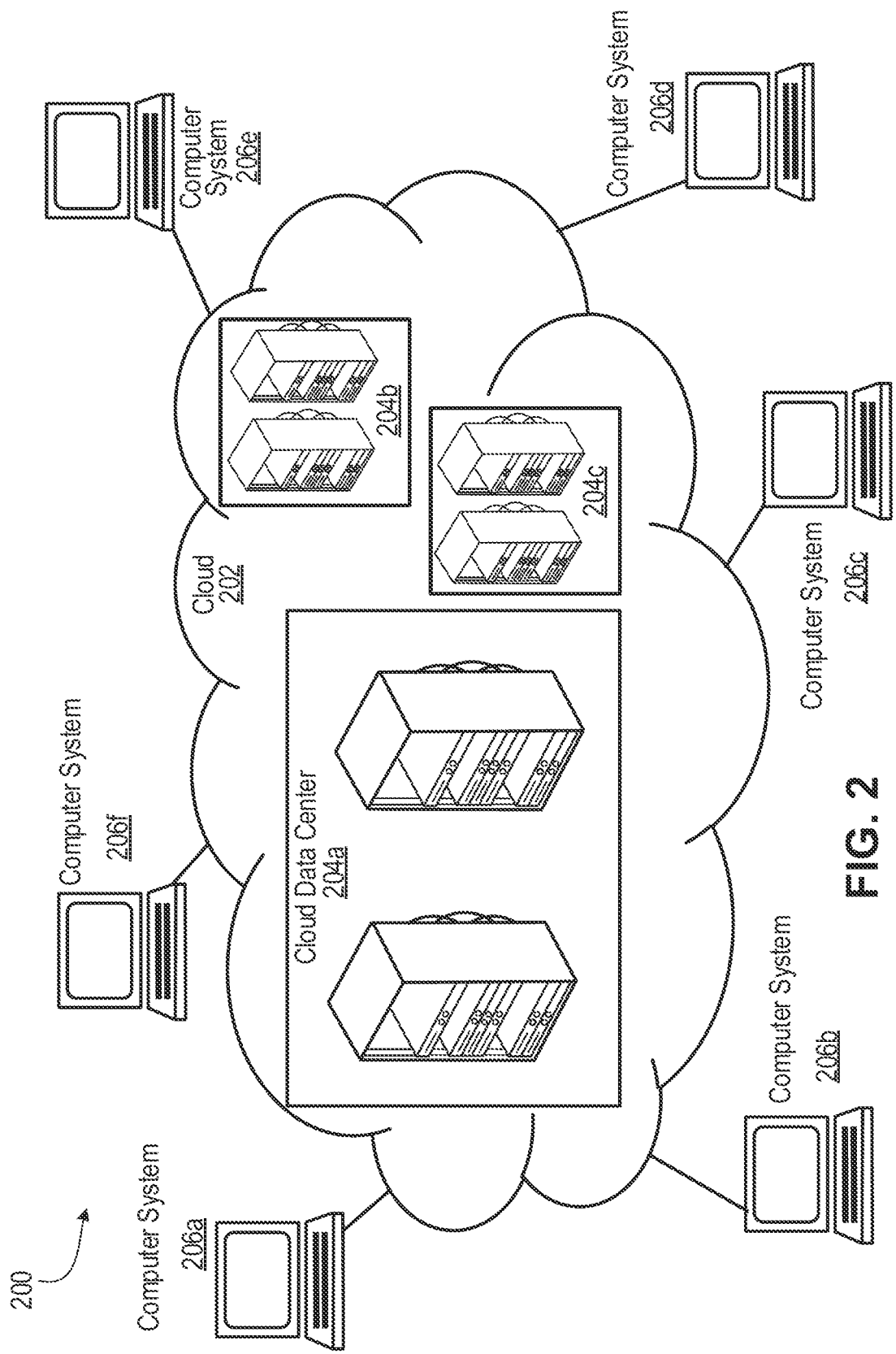
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.), and consumer electronics. In an embodiment, the computing systems 206a-f are implemented in or as a part of other systems.

Figure 3:
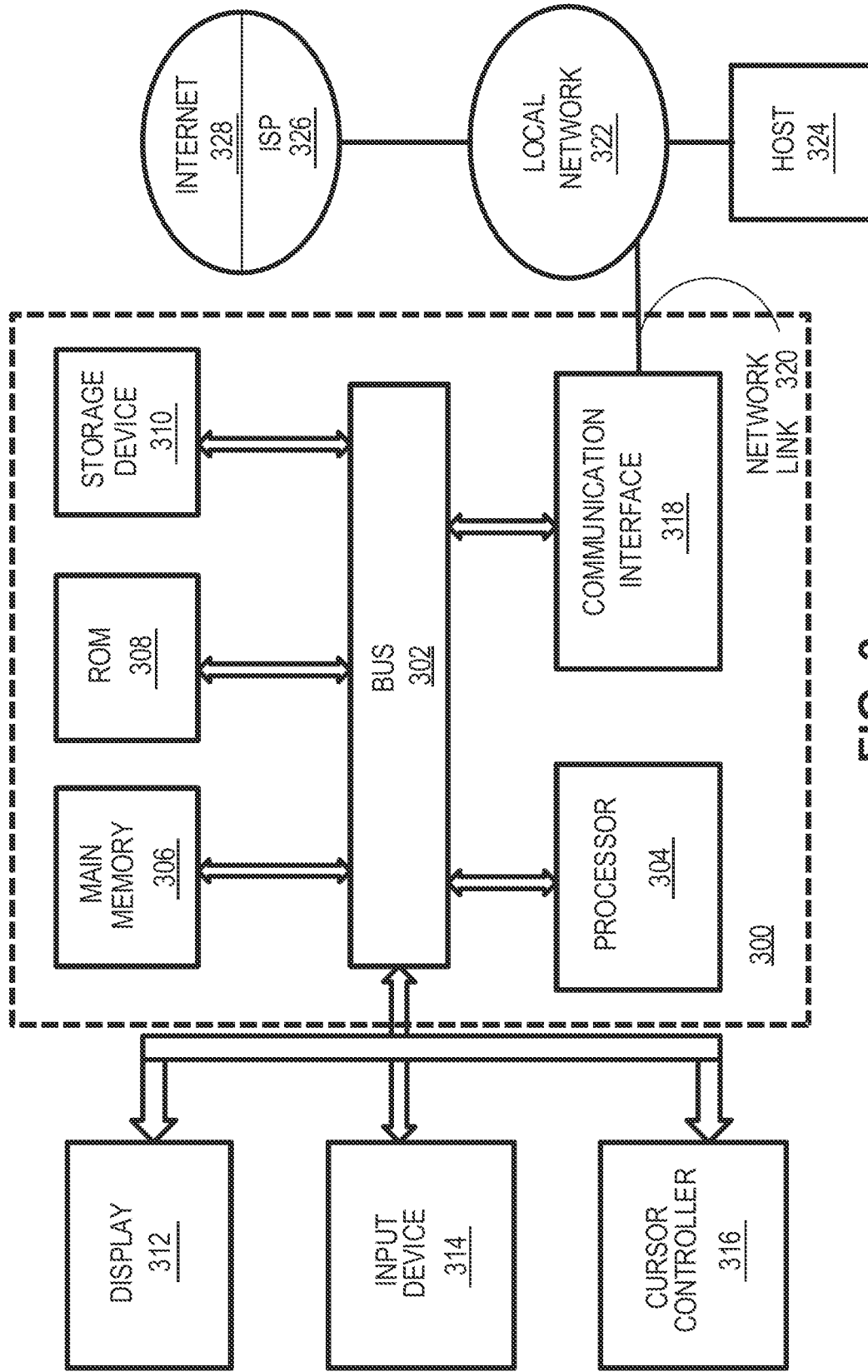
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices, or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
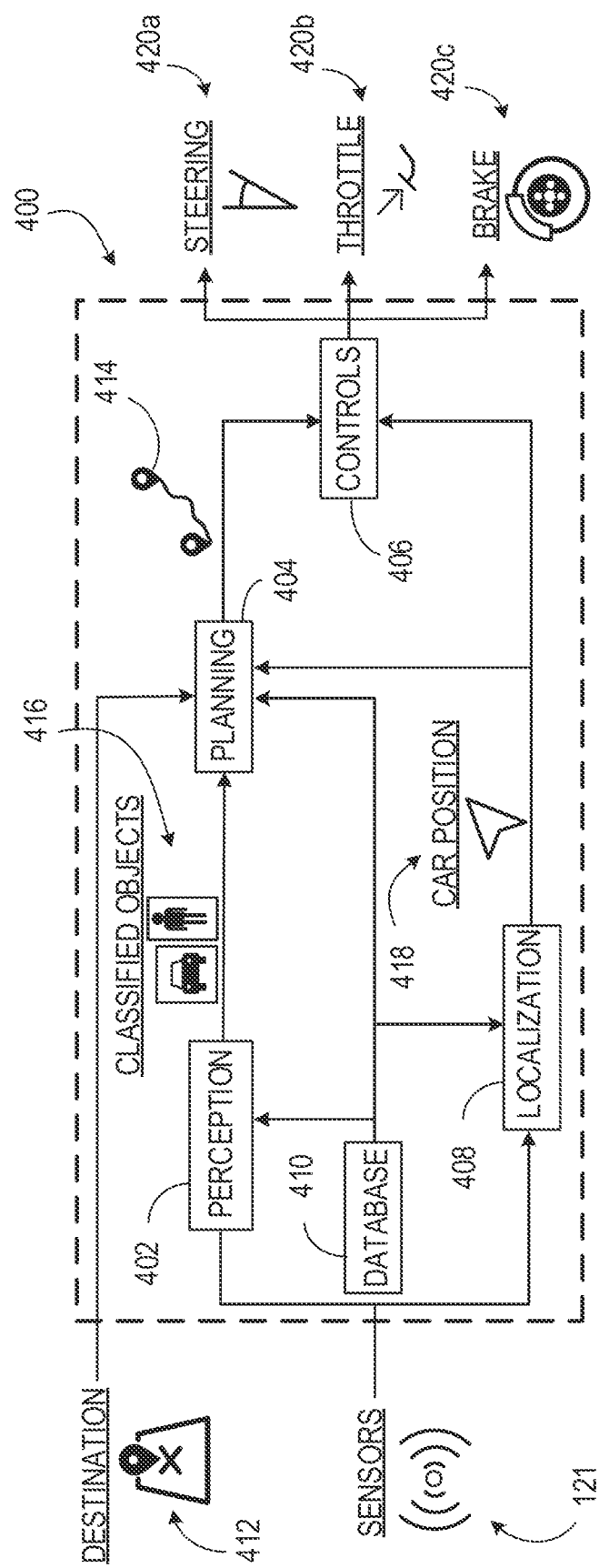
FIG. 4 illustrates an example architecture for an autonomous vehicle.

FIG. 4 illustrates an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs, or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
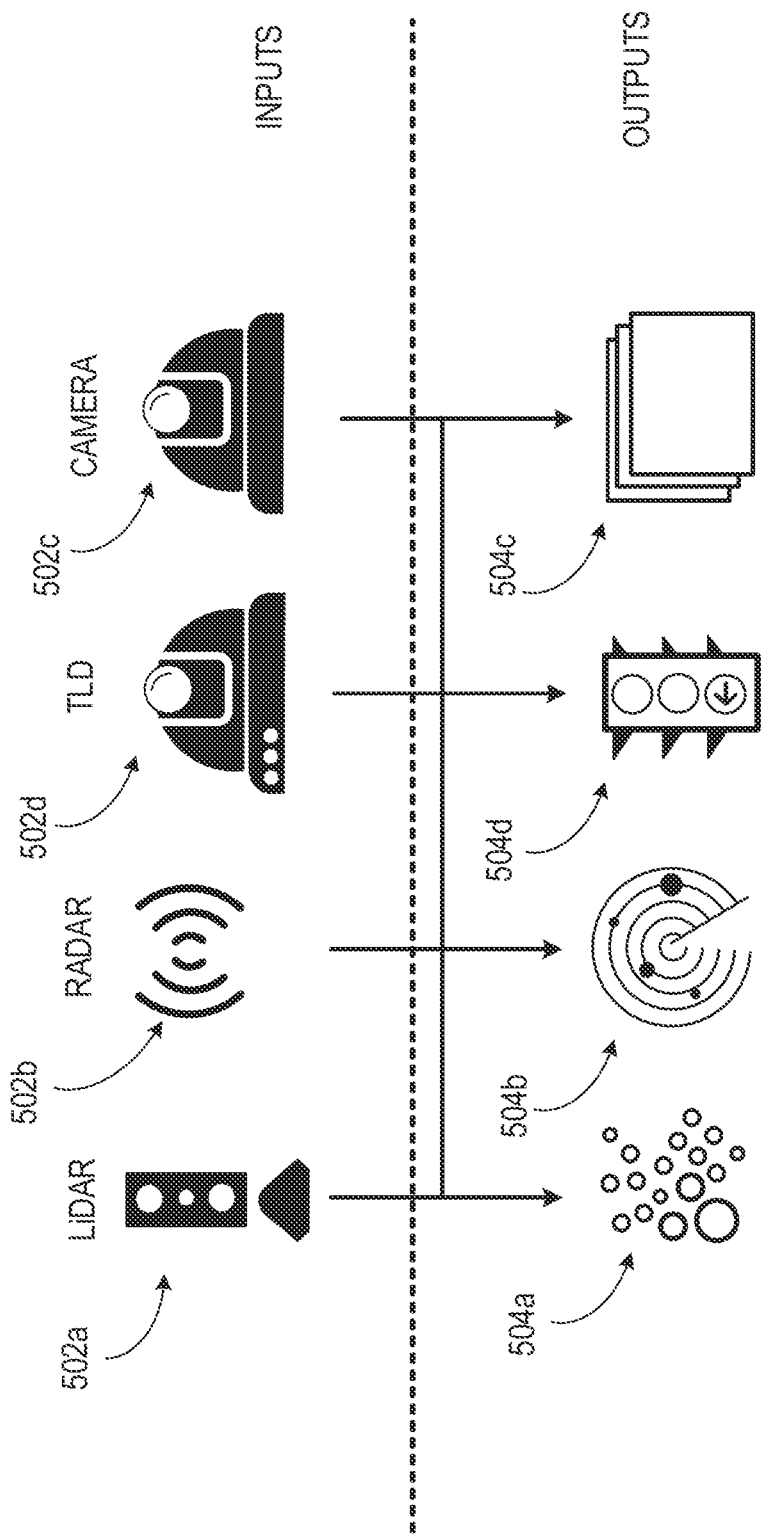
FIG. 5 illustrates an example of inputs and outputs that may be used by a perception module.

FIG. 5 illustrates an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG.

4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 illustrates an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum, for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
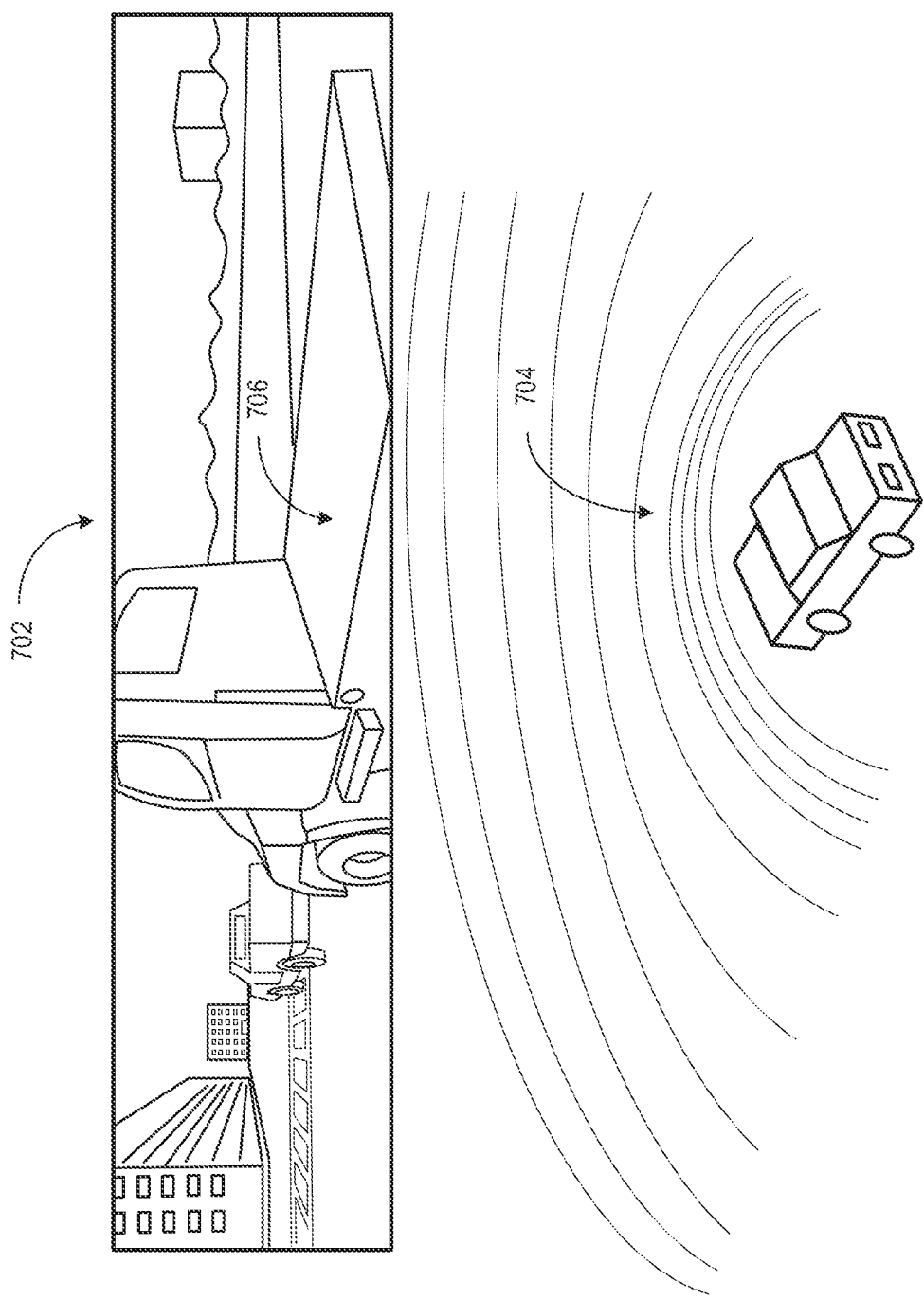
FIG. 7 illustrates the LiDAR system in operation.

FIG. 7 illustrates the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
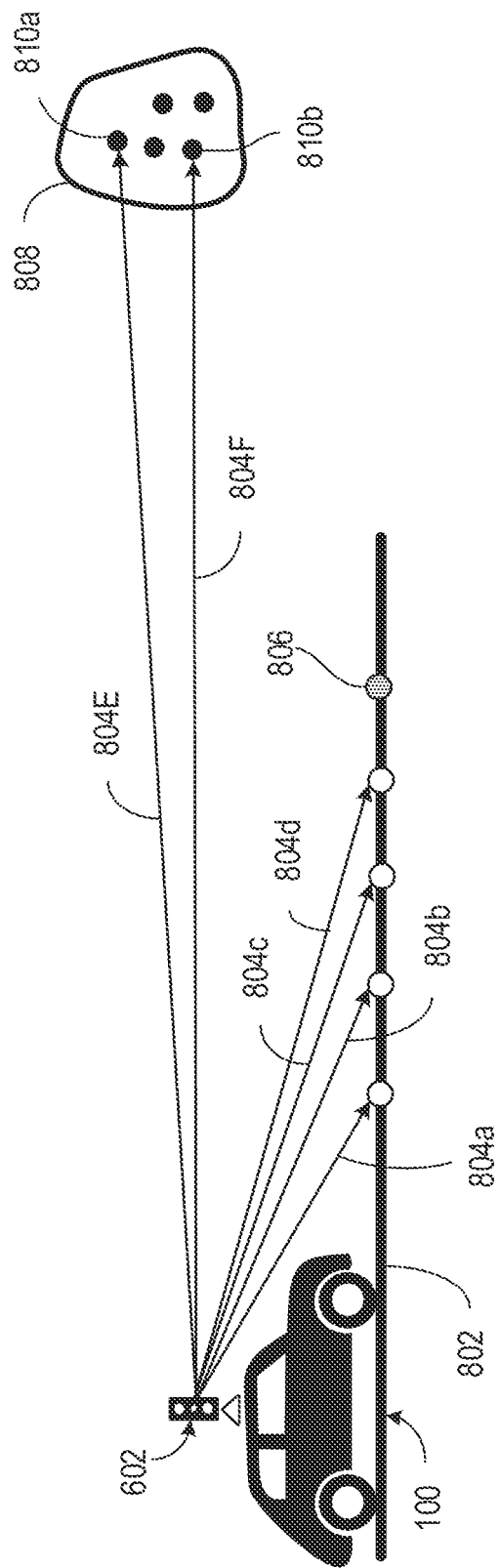
FIG. 8 illustrates the operation of the LiDAR system in additional detail.

FIG. 8 illustrates the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
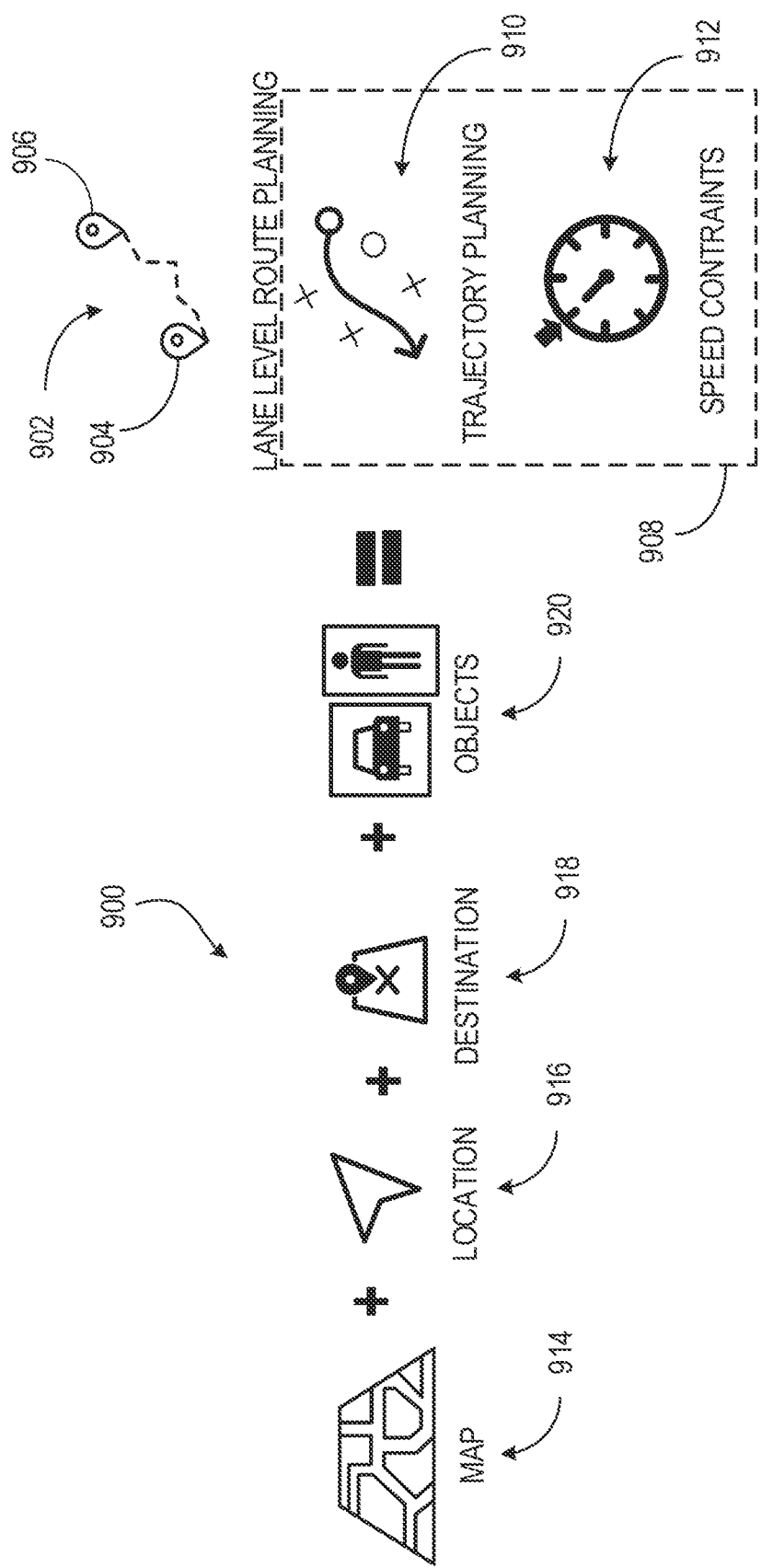
FIG. 9 illustrates a block diagram of the relationships between inputs and outputs of a planning module.

FIG. 9 illustrates a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
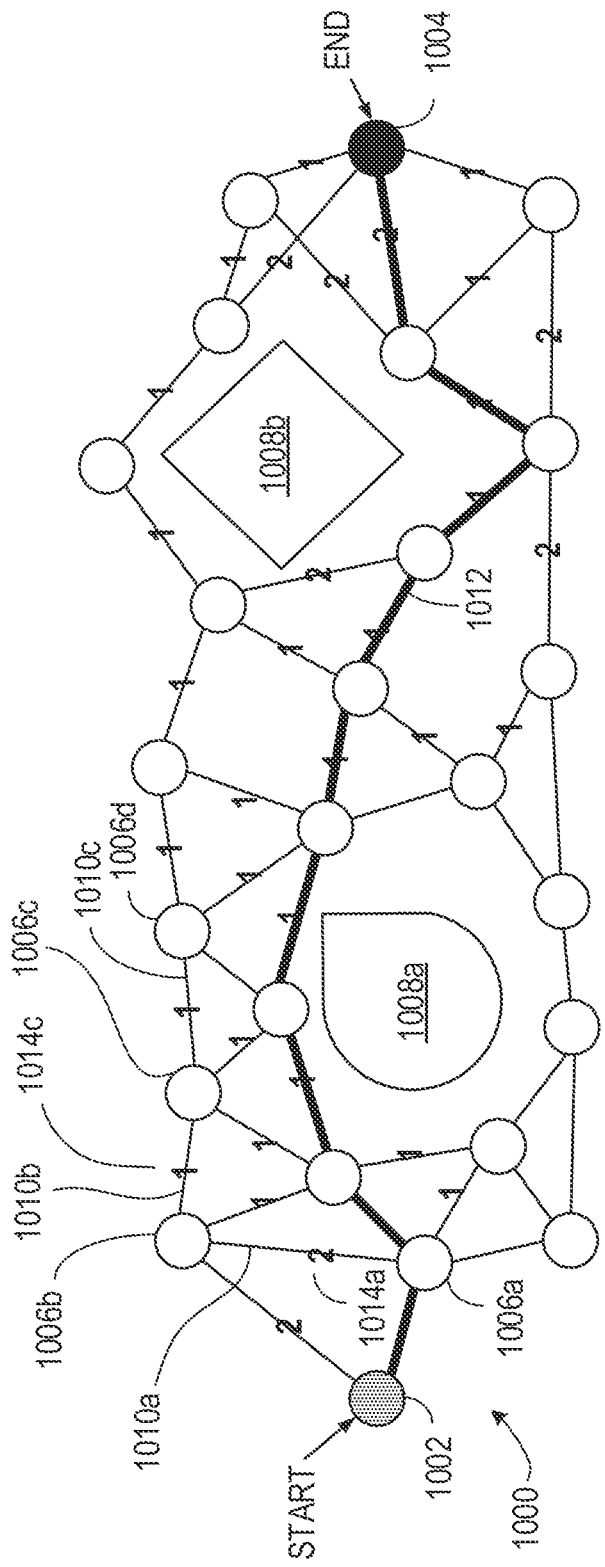
FIG. 10 illustrates a directed graph used in path planning.
Figure 11:
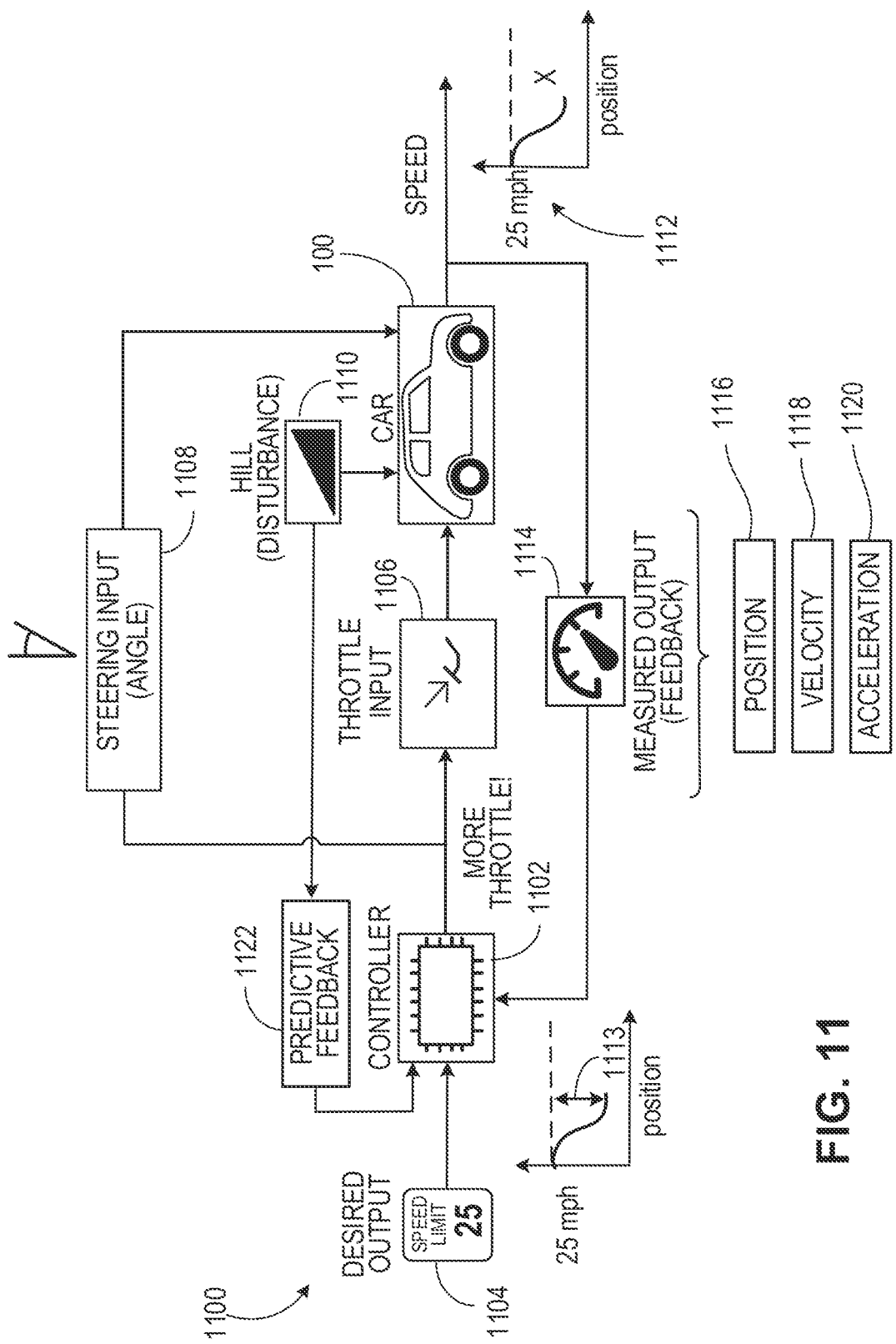
FIG. 11 illustrates a block diagram of the inputs and outputs of a control module.
Figure 12:
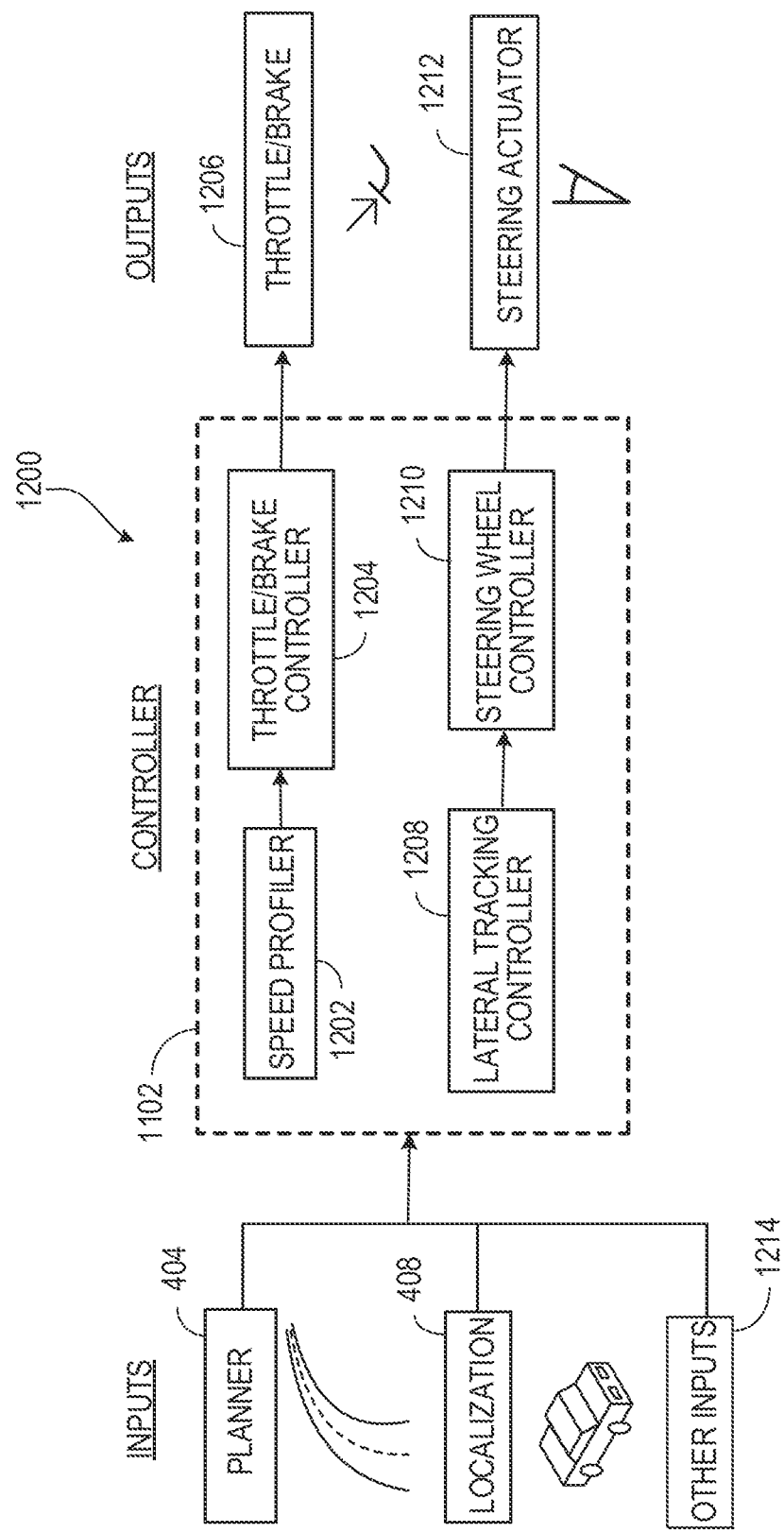
FIG. 12 illustrates a block diagram of the inputs, outputs, and components of a controller.

FIG. 10 illustrates a directed graph 1000 used in path planning, e.g., by the planning module 404 (FIG. 4). In general, a directed graph 1000 like the one shown in FIG. 10 is used to determine a path between any start points 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Systems and Methods for Validating the Calibration of a Sensor System

Figure 13:
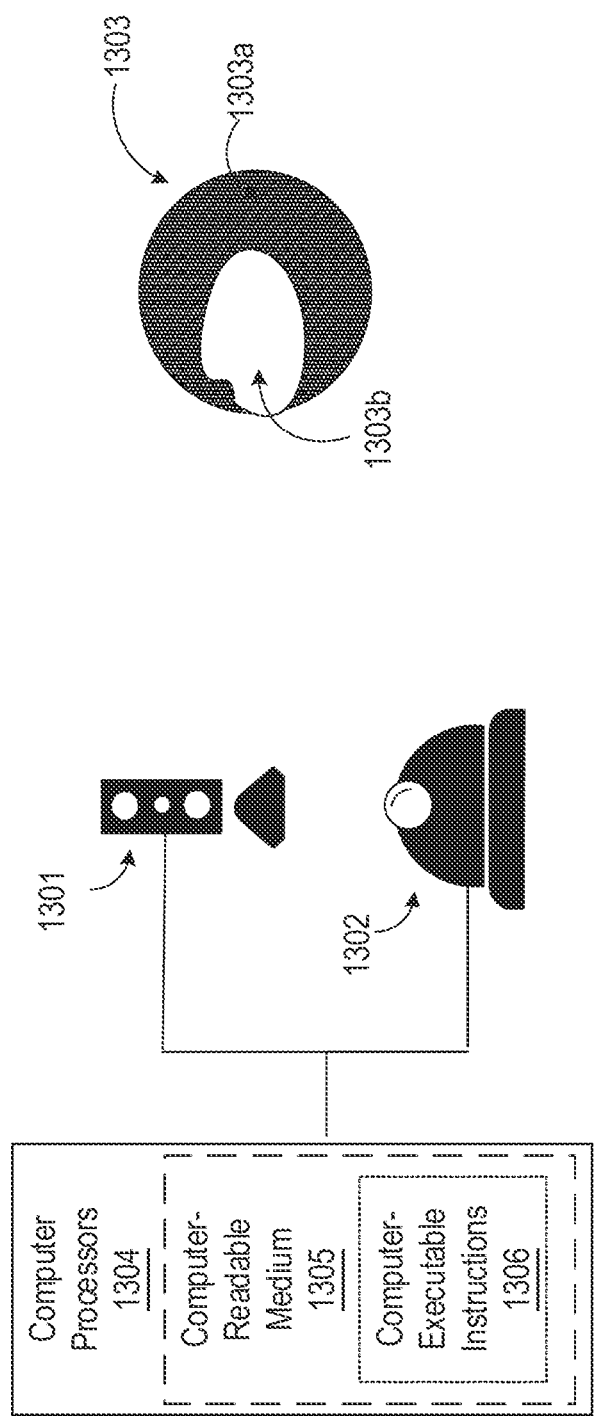
FIG. 13 is an illustration showing a system for validating sensor calibration, in accordance with one or more embodiments of the present disclosure.

FIG. 13 illustrates a system for validating sensor calibration in accordance with one or more embodiments of the present disclosure. The system in FIG. 13 includes a first sensor 1301, a second sensor 1302, an object 1303, and computer processors 1304. The computer processors 1304 include a computer-readable medium 1305. The computer-readable medium 1305 includes computer-executable instructions 1306 stored thereon. The object 1303 is configured to have a substantially non-reflective portion 1303*a*, and, in some embodiments, a substantially reflective portion 1303*b*.

The object 1303 can be configured to have one of several types of shapes. For example, in the illustrated embodiment, the object 1303 has a spherical shape. In an embodiment, the object 1303 has a cubical shape. In an embodiment, the object 1303 has a cuboidal shape. In an embodiment, the object 1303 has a conical shape. The object 1303 can also have a toroidal shape, a triangular shape, a cylindrical shape, a pyramidal shape, or any one of multiple shape primitives. In an embodiment, the object 1303 is a ball. In an embodiment, the object 1303 is a cone. In an embodiment, the object 1303 is a cube. In an embodiment, the object 1303 is located in a building. In an embodiment, the object 1303 is a fixed roadside feature (e.g., street sign, telephone pole, billboard, bridge support column, and so forth). For example, the object may be a billboard that incorporates specialized codes, text, images, or graphics, which are a priori or a posteriori suitable for calibration.

As indicated earlier, the object 1303 can be configured to have a substantially non-reflective portion 1303*a* and a substantially reflective portion 1303*b*. The substantially non-reflective portion 1303*a* includes material such as glass, paints, fabrics, coatings, etc., that absorbs most or all incident light that is not limited to the visible spectrum (e.g., gives a reflectance of less than 5%). For example, in an embodiment, the substantially non-reflective portion 1303*a* includes black paint. In an embodiment, the substantially non-reflective portion 1303*a* includes black fabric. In an embodiment, the substantially non-reflective portion 1303*a* includes anti-reflective coating, which can include transparent thin film structures with alternating layers of contrasting refractive indices. The substantially reflective portion 1303*b* includes materials such as paints, mirrors, fabrics, metals, and so forth, that reflect most or all incident light (e.g., gives a reflectance of more than 70%). The materials and objects are not limited to only specular or Lambertian (or the composition of the two). For example, in an embodiment, the substantially reflective portion 1303*b* includes a glass mirror. In an embodiment, the substantially reflective portion 1303*b* includes an acrylic mirror. In an embodiment, the substantially reflective portion 1303*b* includes reflective tape. In an embodiment, the substantially reflective portion 1303*b* includes biaxially-oriented polyethylene terephthalate ("Mylar").

Each of the sensors 1301, 1302 can be one of several types of sensing devices. For example, in an embodiment, each sensor 1301, 1302 is one of the sensors 121 discussed previously with reference to FIG. 1. In an embodiment, each sensor 1301, 1302 is one or more of the inputs 502*a-c* as discussed previously with reference to FIG. 5. In the shown embodiment, the first sensor 1301 is a LiDAR and the second sensor 1302 is a camera. The camera can be a monocular or stereo video camera configured to capture light in the visible, infrared, ultraviolet, and/or thermal spectra. In an embodiment, at least one of the sensors 1301, 1302 is an ultrasonic sensor. In an embodiment, the first sensor 1301 is a RADAR. At least one of the sensors 1301, 1302 may also include a combination of sensing devices. For example, in an embodiment, at least one of the sensors 1301, 1302 includes a camera and a RADAR. In an embodiment, at least one of the sensors 1301, 1302 also includes additional sensors for sensing or measuring properties of an AV's (e.g., AV100) environment. For example, monocular or stereo video cameras 122 capable of perceiving the visible light, infrared, and/or thermal spectra, LiDAR 123, RADAR, ultrasonic sensors, time-of-flight (TOF) depth sensors, speed sensors, temperature sensors, humidity sensors, and precipitation sensors. Although the illustrated embodiment includes a first sensor 1301 and a second sensor 1302, the system in FIG. 13 can included one or more additional sensors. For example, in an embodiment, the system in FIG. 13 includes a third sensor. In an embodiment, the system in FIG. 13 includes a third, fourth, and fifth sensor.

In an embodiment, the first sensor 1301 is configured to detect distances to locations (e.g., one or more) associated with the substantially reflective portion 1303*b*. For example, in an embodiment, the first sensor 1301 sends rapid pulses of laser light (or radio waves, infrared light, etc.) at several locations associated with the substantially reflective portion 1303*b*, and for each of the several locations associated with the substantially reflective portion 1303*b*, the first sensor 1301 measures the amount of time it takes for each pulse to reflect from each location. Thus, the first sensor 1301 can measure the distance to each location associated with the substantially reflective portion 1303*b* by using the known inherent properties of light (e.g., speed). In an embodiment, the first sensor 1301 does not detect distances to locations associated with the substantially non-reflective portion 1303*a* because, for example, the substantially non-reflective portion 1303*a* does not reflect enough light for the first sensor 1301 to detect.

In an embodiment, the second sensor 1302 is an imaging sensor (e.g., camera) configured to detect light intensity values of locations (e.g., one or more) associated with the substantially reflective portion 1303*b* of the object 1303. For example, in an embodiment, the second sensor 1302 includes CCD and/or CMOS sensors having pixels, where each pixel can detect incoming photons from the locations associated with the substantially reflective portion 1303*b* and generate electrons having energy corresponding to the power (and thereby intensity) of the incoming photons. Due to the spatial arrangement of the pixels, the second sensor 1302 can also detect the spatial locations of the intensity values. In an embodiment, the second sensor 1302 is configured to also detect light intensity values of locations (e.g., one or more) associated with the substantially non-reflective portion 1303*a* of the object 1303. Generally, the light intensity values of locations associated with the substantially non-reflective portion 1303*a* are less than those of the substantially reflective portion 1303*b*.

The computer-readable medium 1306 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 1306 stores code-segment having the computer-executable instructions 1306.

In an embodiment, the computer processors 1304 includes one or more computer processors (e.g., microprocessors, microcontrollers, or both) similar to the processor 304 discussed earlier with reference to FIG. 3. The computer processors 1304 are configured to execute program code such as the computer-executable instructions 1306. The computer processors 1304 are configured to be communicatively coupled to the first and second sensors 1301, 1302. When the computer processors 1304 execute the computer-executable instructions 1304, the computer processors 1304 are caused to carry out several operations.

Figure 14:
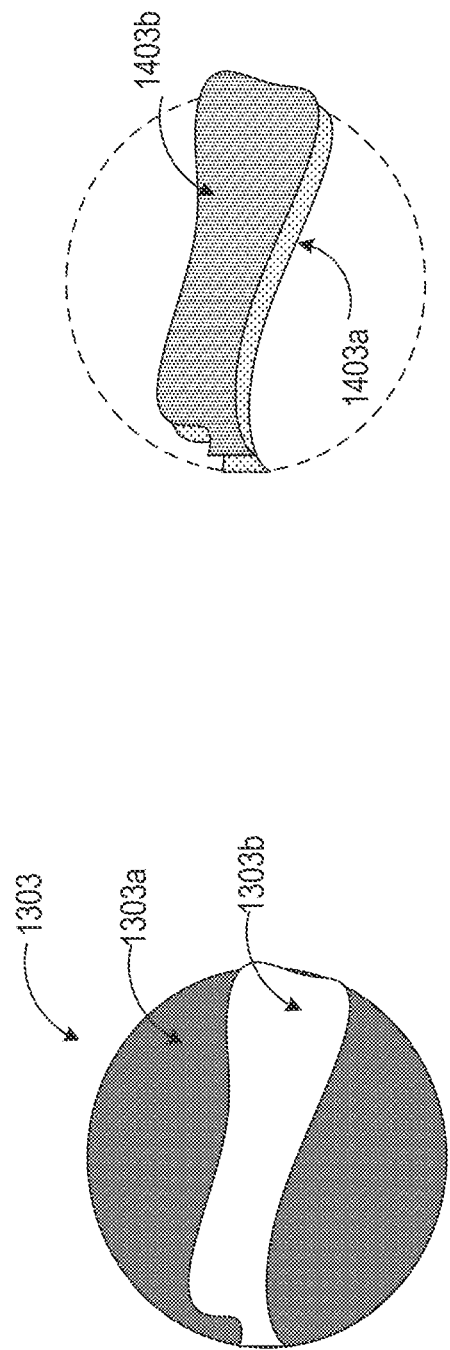
FIG. 14 is an illustrative example of generating a first predicted aggregate location and a second predicted aggregate location, in accordance with one or more embodiments of the present disclosure.

In an embodiment, when the computer processors 1304 are executing the computer-executable instructions 1306, the computer processors 1304 carry out operations to receive, from the first sensor 1301, sensor data associated with the detected distances to the locations associated with the substantially reflective portion 1303*b* of the object 1303. Based on the received sensor data, the computer processors 1304 also carry out operations to generate a first predicted aggregate location associated with the substantially reflective portion 1303*b*. For example, FIG. 14 is an illustrative example of generating a first predicted aggregate location 1403*a* and a second predicted aggregate location 1403*b*, in accordance with one or more embodiments of the present disclosure. Referring to FIG. 14, after receiving the sensor data associated with the detected distances to the locations associated with the substantially reflective portion 1303*b*, the computer processors 1304 generate a first predicted aggregate location 1403*a* for the substantially reflective portion 1303*b* based on the sensor data. In an embodiment, the computer processors 1304 use a first algorithm, which is embodied in the computer-executable instructions 1306, to determine the first predicted aggregate location 1403*a*. Generally, because the first sensor 1301 does not detect distances to locations of the substantially non-reflective portion 1303*a*, the computer processors 1304 are able to determine the location of the substantially reflective portion 1303*b*, which can facilitate the generation of the first predicted aggregate location 1403*a*.

Referring back to FIG. 13, while executing the computer-executable instructions 1306, the computer processors carry out operations to receive, from the second sensor 1302, sensor data associated with the detected intensity values of the locations associated with the substantially reflective portion 1303*b*. Based on the received sensor data from the second sensor 1302, the computer processors 1304 also carry out operations to generate a second predicted aggregate location associated with the substantially reflective portion 1303*b*. For example, referring again to FIG. 14, after receiving the sensor data associated with the intensity values of the locations associated with the substantially reflective portion 1303*b*, the computer processors 1304 generate a second predicted aggregate location 1403*b* for the substantially reflective portion 1303*b* based on the sensor data. In an embodiment, the computer processors 1304 use a second algorithm, which is stored in the computer-executable instructions 1306, to determine the second predicted aggregate location 1403*a*. In an embodiment, the first and second algorithms are different. The first algorithm can be generally based on detected distances and the second algorithm can be based on detected intensity values. For example, the first algorithm can be based on binomial regression. The second algorithm can include a continuously adaptive mean shift (Camshift) function. Generally, because the second sensor 1301 does not detect the intensity values of location associated with the substantially non-reflective portion 1303*a* (or because the intensity values of locations associated with the substantially non-reflective portion 1303*a* will be substantially less than the intensity values of locations associated with the substantially reflective portion 1303*b*), the computer processors 1304 can isolate the location of the substantially reflective portion 1303*b*, which can facilitate the generation of the second predicted aggregate location 1403*b*. Although, for illustrative purposes, the first predicted aggregate location 1403*a* and the second predicted aggregate location 1403*b* are shown as slightly unaligned with respect to each other, in practice, the first and second predicted aggregate locations 1403*a*, 1403*b* can be more aligned than shown, less aligned than shown, or completely aligned.

Referring back to FIG. 13, while executing the computer-executable instructions 1306, the computer processors 1304 determine an alignment error value based on the first predicted aggregate location and the second predicted aggregate location. As indicated earlier, the first predicted aggregate location and the second predicted aggregate location of the substantially reflective portion 1303*b* may be aligned or unaligned with respect to each other. Based on the alignment (or lack thereof), the computer processors 1304 determine an alignment error. For example, referring to FIG. 14, if the first and second predicted aggregate location 1403*a*, 1403*b* completely overlap (and therefore substantially aligned), the computer processors 1304 can determine that the alignment error with respect to the first and second predicted aggregate location 1403*a*, 1403*b* is 0%. Generally, the less the first and second predicted aggregate location 1403*a*, 1403*b* overlap, the larger the alignment error will be.

As indicated earlier, the first predicted aggregate location 1403*a* can be determined using a first algorithm and the second predicted aggregate location 1403*b* can be determined using a second algorithm. In an embodiment, when the alignment error value is greater than a first alignment error threshold, the first and/or second algorithms are adjusted by the computer processors 1304. The first alignment error threshold can be selected based on safety, desired accuracy, and/or computing efficiency considerations. In an embodiment, the first alignment error threshold is 1%. In an embodiment, the first alignment error threshold is 5%. In an embodiment, when the alignment error is greater than the first alignment error threshold, the first and/or second algorithms are adjusted by the computer processors 1304 such that the first and second predicted aggregate locations are substantially aligned (e.g., the alignment error is 0% or significantly close to 0%). In an embodiment, when the alignment error value is greater than the first alignment error threshold, the first and/or second algorithms are adjusted until the alignment error value is below the alignment error threshold. In an embodiment, when the alignment error is greater than a second alignment error threshold, the computer processors 1304 initiate a calibration process for the first sensor 1301 and/or the second sensor 1302. In an embodiment, the second alignment error threshold is greater than the first alignment error threshold. The second alignment error threshold can be selected to reflect situations where the first and second predicted aggregate locations 1403*a*, 1403*b* are unaligned enough that updating algorithms may not be feasible due to safety and/or computational considerations. Examples of calibration processes are detailed below with reference to FIGS. 17-19.

Figure 15:
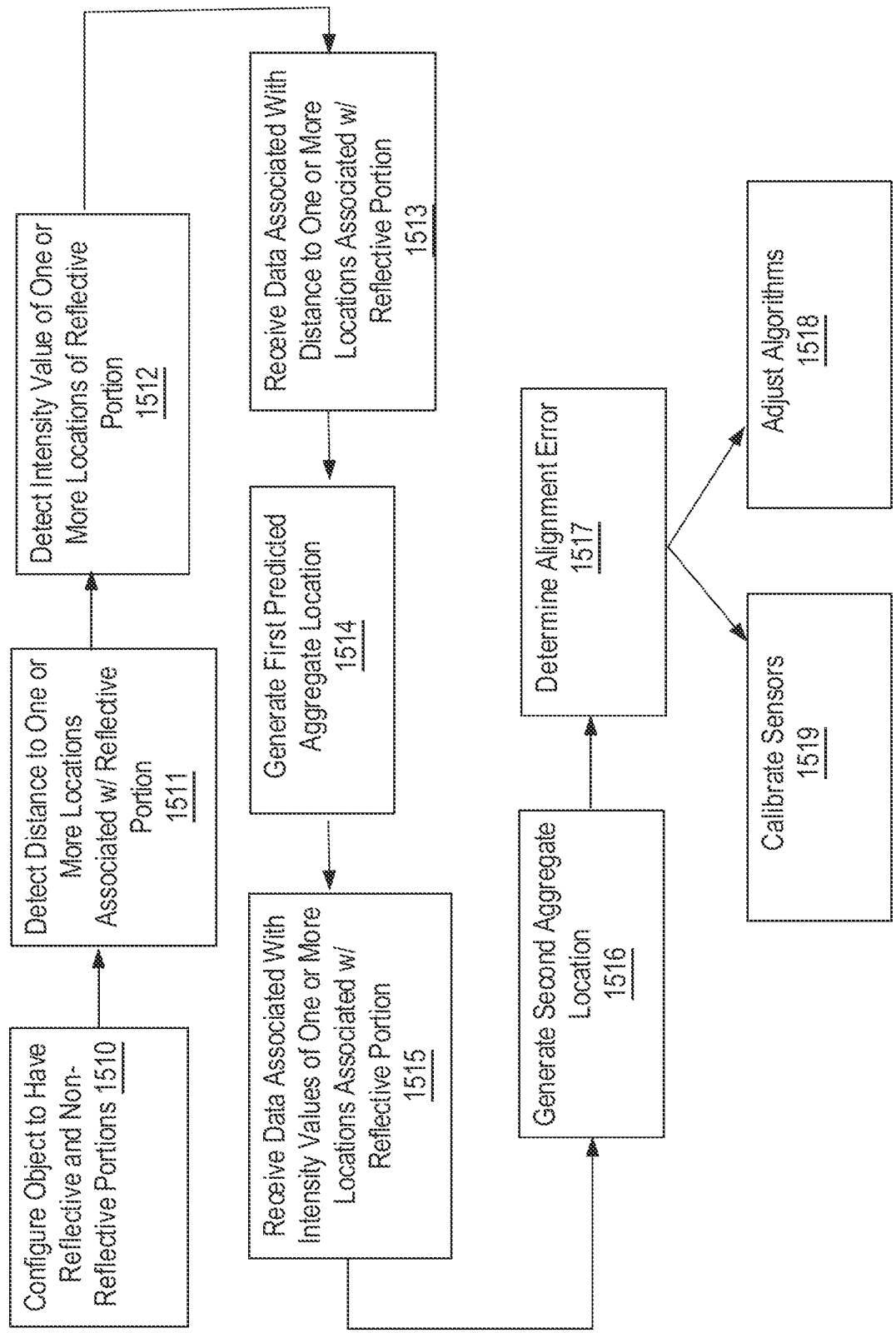
FIG. 15 is a flowchart depicting a method for validating sensor calibration, in accordance with one or more embodiment of the present disclosure.

FIG. 15 is a flowchart depicting a method for validating sensor calibration, in accordance with one or more embodiment of the present disclosure. For illustrative purposes, the method in FIG. 15 will be described as performed by the system in FIG. 13 for validating sensor calibration. However, the method in FIG. 15 can be performed by other systems for validating sensor calibration. The method in FIG. 15 includes configuring an object to have reflective and non-reflective portions (block 1510), detecting the distance to one or more locations associated with the reflective portion (block 1511), detecting intensity values of one or more locations associated with the reflective portion (block 1512), receiving data associated with the distance to one or more locations associated with the reflective portion (block 1513), generating a first predicted aggregate location (block 1514), receiving data associated with intensity values of the one or more locations associated with the reflective portion (block 1515), generating a second predicted aggregate location (block 1516), and determining an alignment error (block 1517). In an embodiment, the method in FIG. 15 includes adjusting algorithms (block 1518). In an embodiment, the method in FIG. 15 includes calibrating sensors (block 1519).

At block 1510, the object 1303 is configured to have a substantially non-reflective portion 1303*a* and a substantially reflective portion 1303*b*. As indicated earlier with reference to FIG. 13, the substantially non-reflective portion 1303*a* can consist of material such as glass, paints, fabrics, coatings, etc. that absorbs most or all incident light (e.g., gives a reflectance of less than 5%). For example, in an embodiment, the substantially non-reflective portion 1303*a* includes black paint. In an embodiment, the substantially non-reflective portion 1303*a* includes black fabric. The substantially non-reflective portion 1303*a* can also consist of anti-reflective coating, which can include transparent thin film structures with alternating layers of contrasting refractive indices. The substantially reflective portion 1303*b* can consist of materials such as paints, mirrors, fabrics, metals, etc., which reflect most or all incident light (e.g., gives a reflectance of more than 70%). For example, in an embodiment, the substantially reflective portion 1303*b* includes a glass mirror. In an embodiment, the substantially reflective portion 1303*b* includes an acrylic mirror. In an embodiment, the substantially reflective portion 1303*b* includes reflective tape. In an embodiment, the substantially reflective portion 1303*b* includes biaxially oriented polyethylene terephthalate ("Mylar").

At block 1511, the first sensor 1301 detects distances to locations (e.g., one or more) associated with the substantially reflective portion 1303*b*. For example, in an embodiment, the first sensor 1301 is a LiDAR and sends rapid pulses of laser light at several locations associated with the substantially reflective portion 1303*b*, and for each of the several locations associated with the substantially reflective portion 1303*b*, the first sensor 1301 measures the amount of time it takes for each pulse to reflect from each location. Thus, the first sensor 1301 can measure the distance to each location associated with the substantially reflective portion 1303*b* by using the inherent properties of light (e.g., speed). In an embodiment, the first sensor 1301 does not detect distances to locations associated with the substantially non-reflective portion 1303*a* because, for example, the substantially non-reflective portion 1303*a* does not reflect enough light for the first sensor 1301 to detect.

At block 1512, the second sensor 1302 detects light intensity values of locations (e.g., one or more) associated with the substantially reflective portion 1303*b* of the object 1303. For example, in an embodiment, the second sensor 1302 includes CCD and/or CMOS sensors having spatially aligned pixels, where each pixel can detect incoming photons from the locations associated with the substantially reflective portion 1303*b* and generate electrons having energy corresponding to the power (and thereby intensity) of the incoming photons. Due to the spatial arrangement of the pixels, the second sensor 1302 can also detect the spatial locations of the intensity values. In an embodiment, the second sensor 1302 also detects light intensity values of locations (e.g., one or more) associated with the substantially non-reflective portion 1303*b* of the object 1303.

At block 1513, the computer processors 1304 receive sensor data from the first sensor 1301 associated with the detected distances to the one or more locations associated with the substantially reflective portion 1303*b*.

At block 1514, the computer processors 1304 generate the first predicted aggregate location 1403*a* for the substantially reflective portion 1303*b* based on the received sensor data from the first sensor 1301. In an embodiment, the computer processors 1304 use a first algorithm, which is stored in the computer-executable instructions 1306, to determine the first predicted aggregate location 1403*a*. Generally, because the first sensor 1301 does not detect distances to locations of the substantially non-reflective portion 1303*a*, the computer processors 1304 are able to isolate the location of the substantially reflective portion 1303*b*, which can facilitate the generation of the first predicted aggregate location 1403*a*.

At block 1515, the computer processors 1304 receive sensor data from the second sensor 1302 associated with the detected intensity values of the locations associated with the substantially reflective portion 1303*b*.

At block 1516, the computer processors 1304 generate the second predicted aggregate location 1403*b* for the substantially reflective portion 1303*b* based on the sensor data received from the second sensor 1302. In an embodiment, the computer processors 1304 use a second algorithm, which is stored in the computer-executable instructions 1306, to determine the second predicted aggregate location 1403*a*. In an embodiment, the first and second algorithms are different. For example, the first algorithm can be generally based on detected distances and the second algorithm can be based on detected intensity values. Generally, because the second sensor 1301 does not detect the intensity values of location associated with the substantially non-reflective portion 1303*a* (or because the intensity values of locations associated with the substantially non-reflective portion 1303*a* will be substantially less than the intensity values of locations associated with the substantially reflective portion 1303*b*), the computer processors 1304 can isolate the location of the substantially reflective portion 1303*b*, which can facilitate the generation of the second predicted aggregate location 1403*b*. As indicated earlier with reference to FIG. 13, the first and second predicted aggregate locations 1403*a*, 1403*b* can be partially aligned, completely aligned, or completely unaligned.

At block 1517, the computer processors 1304 determine an alignment error value based on the first predicted aggregate location 1403*a* and the second predicted aggregate location 1403*b*. As indicated earlier, the first predicted aggregate location 1403*a* and the second predicted aggregate location 1403*b* of the substantially reflective portion 1303*b* may be aligned or unaligned with respect to each other. Based on the alignment (or lack thereof), the computer processors 1304 determine an alignment error. For example, if the first and second predicted aggregate location 1403*a*, 1403*b* completely overlap (and therefore are substantially aligned), the computer processors 1304 can determine that the alignment error with respect to the first and second predicted aggregate location 1403*a*, 1403*b* is 0%. Generally, the less the first and second predicted aggregate location 1403*a*, 1403*b* overlap, the larger the alignment error will be.

At block 1518, the computer processors 1304 adjust the first and/or second algorithms used by the computer processors 1304 to determine the first and second predicted aggregate location 1403*a*, 1403*b*, respectively, when the alignment error value is greater than a first alignment error threshold. The first alignment error threshold can be selected based on safety, desired accuracy, and/or computing efficiency considerations. In an embodiment, the first alignment error threshold is 1%. In an embodiment, the first alignment error threshold is 5%. In an embodiment, when the alignment error is greater than the first alignment error threshold, the first and/or second algorithms are adjusted such that the first and second predicted aggregate locations are substantially aligned (e.g., the alignment error is 0% or significantly close to 0%). In an embodiment, when the alignment error value is greater than the first alignment error threshold, the first and/or second algorithms are adjusted until the alignment error value is below the alignment error threshold.

At block 1519, when the alignment error is greater than a second alignment error threshold, the computer processors 1304 initiate a calibration process for the first sensor 1301 and/or the second sensor 1302. In an embodiment, the second alignment error threshold is greater than the first alignment error threshold. The second alignment error threshold can be selected to reflect situations where the first and second predicted aggregate locations 1403*a*, 1403*b* are unaligned enough that updating algorithms may not be feasible due to safety and/or computational considerations. Examples of calibration processes are detailed below with reference to FIGS. 17-19.

Systems and Methods for Calibrating a Sensor System

Figure 16:
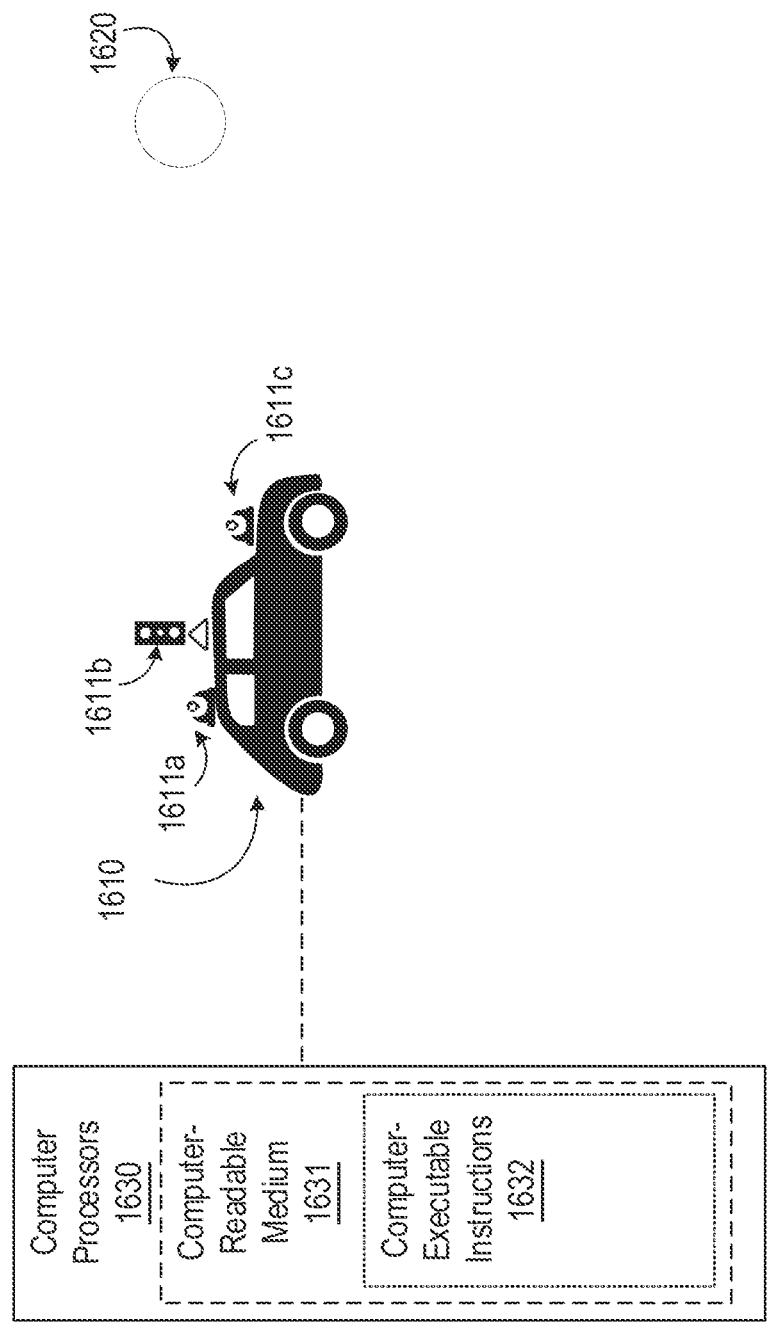
FIG. 16 is an illustration showing a system for calibrating sensors, in accordance with one or more embodiments of the present disclosure.

FIG. 16 illustrates a system for calibrating sensors, in accordance with one or more embodiments of the present disclosure. The system includes an AV 1610, a first sensor 1611*a*, a second sensor 1611*b*, a third sensor 1611*c*, an object 1620 and computer processors 1630. The computer processors 1630 include a computer-readable medium 1631. The computer-readable medium 1631 includes computer-executable instructions 1632 stored thereon.

The object 1620 can be configured to have one of several types of shapes. For example, in the illustrated embodiment, the object 1620 has a spherical shape. In an embodiment, the object 1620 has a cubical shape. In an embodiment, the object 1620 has a cuboidal shape. In an embodiment, the object 1620 has a conical shape. The object 1320 can also have a toroidal shape, a triangular shape, a cylindrical shape, a pyramidal shape, and so forth. In an embodiment, the object 1620 is a ball. In an embodiment, the object 1620 is a cone. In an embodiment, the object 1620 is a cube. In an embodiment, the object 1620 includes three surfaces defining mutually perpendicular planes. The object 1620 can also be a fixed road or building structure in the AV's 1610 environment. For example, in an embodiment, the object 1620 is a street sign. In an embodiment, the object 1620 is a billboard. In an embodiment, the object 1620 is a building support beam (e.g., parking lot support beam). The object 1620 can also be naturally occurring in the AV's 1610 environment. For example, in an embodiment, the object 1620 is a tree. In an embodiment, the object 1620 is a large boulder. Although only one object 1620 is shown for illustrative purposes, the system in FIG. 16 can include additional objects, each additional object being one of several types (i.e., cube, support beam, tree, etc.).

The object 1620 has at least one calibration feature. For example, in an embodiment, the object 1620 has at least one fixed printed patterns detectable by the sensors 1611*a*, 1611*b*, 1611*c*. In an embodiment, the object 1620 has a fixed location. In an embodiment, the object 1620 has a fixed distance from another object. In an embodiment, the object 1620 has a plurality of edges. In an embodiment, the object 1620 has an inner metal core having a size optimized for RADAR detection (e.g., optimized to reduce uncertainty) and an augmented portion which is detectable by LiDAR but substantially undetectable by RADAR (e.g., invisible RADAR foam, cardboard, etc.). Thus, the object 1620 can be detectable by RADAR and LiDAR, while decreasing the uncertainty of measurements from RADAR detection.

In the embodiment, the first sensor 1611a, second sensor 1611b, and third sensor 1611c are mounted on the AV 1610. The AV 1610 can include more or less sensors than the first, second, and third sensors 1611a, 1611b, 1611c. For example, in an embodiment, the AV 1610 only includes the first sensor 1611a and the second sensor 1611b. In an embodiment, the AV 1610 includes a fourth sensor (or a fifth sensor, sixth sensor and, and so forth).

Each of the sensors 1611a, 1611b, 1611c can be one of several types of sensing devices. For example, in an embodiment, each of the sensors 1611a, 1611b, 1611c is one of the sensors 121 discussed previously with reference to FIG. 1. In an embodiment, each of the sensors 1611a, 1611b, 1611c is one or more of the inputs 502a-c as discussed previously with reference to FIG. 5. In the shown embodiment, the first sensor 1611a is a LiDAR, the second sensor 1611b is a camera, and the third sensor 1611c is a RADAR. The camera can be a monocular or stereo video camera configured to capture light in the visible, infrared, and/or thermal spectra. In an embodiment, at least one of the sensors 1611a, 1611b, 1611c is an ultrasonic sensor. At least one of the sensors 1611a, 1611b, 1611c may also include a combination of sensing devices. For example, in an embodiment, at least one of the sensors 1611a, 1611b, 1611c includes a camera and a RADAR. In an embodiment, at least one of the sensors 1611a, 1611b, 1611c also includes additional sensors for sensing or measuring properties of the AV's 1610 environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

Each of the sensors 1611a, 1611b, 1611c have a plurality of intrinsic parameters. Intrinsic parameters can include, for example, operating frequencies (e.g., signal frequencies), beam width, signal-to-noise ratio, internal noise, beam intensity levels, operating temperature, focal length, field of view, and so forth. Each of the sensors 1611a, 1611b, 1611c have a plurality of extrinsic parameters. Extrinsic parameters can include, for example, the locations of the sensors 1611a, 1611b, 1611c as they are mounted on the AV 1610, the distances of the sensors 1611a, 1611b, 1611c with respect to each other, the noise level of the environment of the AV 1610 (e.g., fog, smoke, rain, etc.), the ambient brightness of the AV's 1610 environment, the angle/tilt of the sensors, 1611a, 1611b, 1611c and so forth. In an embodiment, one or more of the sensors 1611a, 1611b, 1611c includes at least one monitoring device configured to detect the intrinsic parameters of the corresponding sensor. For example, in an embodiment, at least one of the sensors 1611a, 1611b, 1611c includes a temperature sensor configured to measure operating temperatures. In an embodiment, at least one of the sensors 1611a, 1611b, 1611c include an electromagnetic wave sensor, which can measure electromagnetic power.

Each of the sensors 1611a, 1611b, 1611c is configured to detect the at least one calibration feature of the object 1620 while the object 1620 and the AV 1610 move with respect to each other. For example, in an embodiment, the first sensor 1611a is a LiDAR, the second sensor 1611b is a stereo camera, the third sensor 1611c is a RADAR, and the object 1610 is a cuboidal structure having a printed pattern (i.e., calibration feature) on each of its surfaces. Each of the sensors 1611a, 1611b, 1611c are configured to detect the location of each printed pattern of the object 1620 as the object 1620 is rotated (e.g., by a person or machine) around the AV 1610. Each of the sensors 1611a, 1611b, 1611c generate several point clouds associated with the printed pattern as the object 1620 and the AV 1610 rotate with respect to each other. In an embodiment, the object 1610 is a stationary road sign and each of the sensors 1611a, 1611b, 1611c are configured to detect the center and/or edges (i.e., calibration features) of the road sign, while generating several point clouds associated with the center and/or edges of the stationary road sign as the AV 1610 and the road sign move with respect to each other.

The computer-readable medium 1631 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 1306 stores code-segment having the computer-executable instructions 1632.

In an embodiment, the computer processors 1630 includes one or more computer processors (e.g., microprocessors, microcontrollers, or both) similar to the processor 304 discussed earlier with reference to FIG. 3. The computer processors 1630 are configured to execute program code, such as the computer-executable instructions 1632. The computer processors 1630 are configured to be communicatively coupled to the first, second, and third sensors 1611a, 1611b, 1611c. In an embodiment, the computer processors 1630 are communicatively coupled to remotely located database 134. When the computer processors 1630 execute the computer-executable instructions 1632, the computer processors 1630 are caused to carry out several operations.

In an embodiment, when the computer processors 1630 are executing the computer-executable instructions 1632, the computer processors 1630 carry out operations to receive known calibration feature data associated with at least one calibration feature of the object 1620. The known calibration feature data can be received from several sources. For example, in an embodiment, the known calibration feature data is received from user input. In an embodiment, the known calibration feature data is received from the remotely located database 134, and corresponds to sensor data from a calibrated sensor remote from the AV 1610. For example, assume that the object 1620 is a street sign along a road. The computer processors 1630 can receive point cloud data associated with the location of the center of the street sign (or the corners of the street sign) that was generated by one or more remote sensors (e.g., sensors mounted on a second AV) from the remotely located database 134.

In an embodiment, the known calibration feature data is received from one of the sensors 1611a, 1611b, 1611c of the AV 1610 that is known to be the most accurate. For example, assume that the object 1620 is a cuboidal structure with printed patterns and that the first sensor 1611a is known to be the most accurate. In an embodiment, one of the sensors 1611a, 1611b, 1611c has been pre-calibrated, and the known calibration feature data is received from the pre-calibrated sensor. In an embodiment, known calibration feature data is received from one of the sensors 1611a, 1611b, 1611c based on the type of sensor. For example, if the first sensor 1611a is a LiDAR, it can be chosen to represent the known calibration feature data because it is may be more accurate at detecting objects positioned at longer ranges. The computer processors 1630 can receive, from the first sensor 1611*a*, point cloud data associated with the location of the printed patterns. In an embodiment, the known calibration data is received from the remotely located database 134, and corresponds to sensor data from at least one of the sensors 1611*a*, 1611*b*, 1611*c* from a previous calibration process. For example, assume that one of the sensors 1611*a*, 1611*b*, 1611*c* was calibrated at an earlier time using a cuboidal structure with printed patterns. The point cloud data generated during the previous calibration process is stored in the remotely located database 134 (or the computer-readable medium 1631), and the computer processors 1630 receive this previously generated point cloud data from the remotely located database 134 (or the computer-readable medium 1631).

When the computer processors 1630 are executing the computer-executable instructions 1632, the computer processors 1630 further carry out operations to receive, from each of the sensors 1611*a*, 1611*b*, 1611*c*, detected feature data associated with the at least one calibration feature of the object 1620. For example, in an embodiment, the object 1620 is a cuboidal structure with printed patterns, and the computer processors 1630 receive, from each of the sensors 1611*a*, 1611*b*, 1611*c*, point cloud data associated with the location of the printed patterns as the object 1620 and the AV 1610 moved with respect to each other. In an embodiment, the object 1620 is a street sign, and the computer processors 1630 receive, from each of the sensors 1611*a*, 1611*b*, 1611*c*, point cloud data associated with the location of the center and/or corners of the street sign as the street sign and the AV 1610 moved with respect to each other.

When the computer processors 1630 are executing the computer-executable instructions 1632, the computer processors 1630 further carry out operations to compare the received known feature data with the detected feature data received from each of the sensors 1611*a*, 1611*b*, 1611*c*. For example, in an embodiment, the received known feature data is point cloud data associated with the location of the center of a street sign that was detected by a remote sensor as a second AV moved relative to the street sign (the remote sensor being mounted on the AV). The received detected feature data is point cloud data associated with the location of the center of the same street sign that was detected by each of the sensors 1611*a*, 1611*b*, 1611*c* as the AV 1610 moved relative to the street sign. The computer processors 1630 compare the point cloud data from the remote sensor with the point cloud data from each of the sensors 1611*a*, 1611*b*, 1611*c*. In another embodiment, the received known feature data is point cloud data associated with the location of the printed patterns on a cuboidal structure which was generated by the first sensor 1611*a*, which was predetermined to be the most accurate sensor of the three sensors, as the cuboidal structure and the AV 1610 moved with respect to each other. The received detected feature data is point cloud data associated with the locations of the printed patterns on the same cuboidal structure, which was generated by the second and third sensors 1611*b*, 1611*c*, as the cuboidal structure and the AV 1610 moved with respect to each other. The computer processors 1630 compare the point cloud data generated by the first sensor 1611*a* with the point cloud data generated by the other sensors 1611*b*, 1611*c*.

When the computer processors 1630 are executing the computer-executable instructions 1632, the computer processors 1630 further carry out operations to generate, for each of the sensors 1611*a*, 1611*b*, 1611*c*, a calibration error value based on the comparison of the received known feature data with the received detected feature data from the sensors 1611*a*, 1611*b*, 1611*c*. For example, in an embodiment, the computer processors 1630 use the known feature data (e.g., point cloud data generated by a remote sensor, the most accurate sensor of the three sensors 1611*a*, 1611*b*, 1611*c*, etc.) as reference, and compares the detected feature data (e.g., point cloud data) generated by the sensors 1611*a*, 1611*b*, 1611*c*. In an embodiment, the computer processors compare each point of the point clouds from the sensors 1611*a*, 1611*b*, 1611*c* to a corresponding point in the reference point cloud and calculates an error, for each sensor 1611*a*, 1611*b*, 1611*c*, based on the distances between them. Typically, smaller distances between each point of the point clouds generated by each of the sensors 1611*a*, 1611*b*, 1611*c*, and the corresponding points of the reference point cloud, will lead to smaller calculated errors. Errors can also be present if the reference point cloud encompasses more points than the point clouds associated with the detected feature data. For example, a LiDAR may generate more points in a point cloud than a camera when the object 1620 is located at a distance that is fully detectable by the LiDAR but may not be fully detectable by the camera in its current focal length setting.

When the computer processors 1630 are executing the computer-executable instructions 1632, the computer processors 1630 further carry out operations to determine that the sensors 1611*a*, 1611*b*, 1611*c* are incorrectly calibrated when their corresponding calibration error value exceeds a first calibration error threshold. The first calibration error threshold can be selected based on, for example, accuracy, safety, and efficiency considerations. For example, in an embodiment, the computer processors 1630 determine one or more of the sensors 1611*a*, 1611*b*, 1611*c* are incorrectly calibrated when their corresponding calibration error value exceeds a 5% error. In an embodiment, the computer processors 1630 determine one or more of the sensors 1611*a*, 1611*b*, 1611*c* are incorrectly calibrated when each point of their corresponding point cloud is separated from a corresponding point in the reference point cloud by a distance exceeding 0.5 m.

In an embodiment, when the computer processors 1630 are executing the computer-executable instructions 1632, the computer processors 1630 further carry out operations to compute a corrected parameter for at least one intrinsic parameter associated with the one or more sensors 1611*a*, 1611*b*, 1611*c* determined to be incorrectly calibrated. For example, in an embodiment, the computer processors 1630 determine, based on the calibration error value, that the incorrectly calibrated sensor should increase its beam power such that detection accuracy will increase. In an embodiment, the first sensor 1611*a* is the reference sensor and is a LiDAR, and the second sensor 1611*b* is a camera. If the computer processors 1630 determine that the calibration error was due to the object 1620 being too far away for the second sensor 1611*b* to detect in its current state, and therefore leading to less points in the point cloud with respect to the first sensor's 1611 point cloud, the computer processors 1630 determines that the focal length of the second sensor 1611*b* needs to be adjusted such that it aligns with the first sensor's 1611*a* detection range.

As previously indicated the sensors 1611*a*, 1611*b*, 1611*c* can include monitoring devices configured to detect one or more intrinsic parameters of the sensors 1611*a*, 1611*b*, 1611*c*. In an embodiment, the computer processors 1630 receive intrinsic data associated with the one or more intrinsic parameters of the sensors 1611*a*, 1611*b*, 1611*c* and compute the corrected parameters based on the received intrinsic data. For example, in an embodiment, the second sensor 1611*b* is a LiDAR and includes a temperature sensor and an electromagnetic wave sensor. The computer processors 1630 receive the current operating temperature and the current beam power settings from the monitoring devices of the second sensor 1611*b*. If the computer processors 1630 determine that the second sensor 1611*b* is incorrectly calibrated and needs to increase its beam power (which can increase the operating temperature of the second sensor 1611*b*), the computer processors 1630 can compute an increased beam power based on the received intrinsic data such that the increase in beam power does not overheat the second sensor 1611*b*.

In an embodiment, once the computer processors 1630 compute the corrected parameter, they modify the one or more sensors 1611*a*, 1611*b*, 1611*c* determined to be incorrectly calibrated in accordance with the computed corrected parameters. For example, if the computer processors 1630 compute an increased beam power for the second sensor 1611*b*, it can modify the beam power of the second sensor 1611*b* by using, for example, the second sensor's 1611*b* beam power adjustment system. If the computer processors 1630 compute an increased focal length for the third sensor 1611*c*, it can modify the focal length of the second sensor 1611*c* by, for example, adjusting at least one lens of the third sensor 1611*c*.

In an embodiment, when the computer processors 1630 are executing the computer-executable instructions 1632, the computer processors 1630 further carry out operations to determine that one or more of the sensors 1611*a*, 1611*b*, 1611*c* determined to be incorrectly calibrated is in a failure state when their corresponding calibration error value exceeds a second calibration error threshold. For example, assume that each point of the point cloud associated with the detected feature data received from the second sensor 1611*b* is separated from corresponding points in the reference point cloud by a distance of 5 meters. In an embodiment, the second calibration error threshold is 4 meters, and the computer processors 1630 determine that the second sensor 1611*b* is in a failure state. As another example, the third sensor 1611*b* may not generate the same amount of points in its point cloud as the reference point cloud with respect to the object 1620, causing a 20% error. If the second calibration error threshold is 15%, the computer processors 1630 can determine that the third sensor 1611*b* is in a failure state. A failure state can indicate that a sensor has been physically knocked out of alignment, a sensor is operating in environmental conditions that are not conducive for detection (e.g., a camera operating in highly foggy conditions), a sensor's aperture has become too dirty for detection, and so forth. In an embodiment, the second calibration threshold is greater than the first calibration error threshold. The second calibration error threshold can be chosen based on, for example, accuracy, safety, and efficiency considerations. In an embodiment, the second calibration error threshold is chosen to reflect errors that cannot be sufficiently fixed, with respect to safety considerations, by tuning intrinsic parameters.

In an embodiment, when the computer processors 1630 are executing the computer-executable instructions 1632, the computer processors 1630 further carry out operations to computer a corrected parameter for at least one extrinsic parameter associated with the sensors 1611*a*, 1611*b*, 1611*c* determined to be in a failure state. For example, assume that the first sensor 1611*a* is determined to be in a failure state because its point cloud was unaligned with the reference point cloud such that a 20% calibration error value was calculated. In an embodiment, the computer processors 1630 determine that, based on the calibration error value, the first sensor's 1611*a* tilt angle should be adjusted in order to align its point cloud with the reference point cloud.

In an embodiment, when the computer processors 1630 are executing the computer-executable instructions 1632, the computer processors 1630 further carry out operations to cause one or more vehicle operations when at least one of the sensors' 1611*a*, 1611*b*, 1611*c* calibration error value exceeds a calibration error threshold. For example, in an embodiment, if at least one of the sensors' 1611*a*, 1611*b*, 1611*c* calibration error value exceeds the second calibration error threshold, the computer processors 1630 causes the AV 1610 to cease operation (e.g., by turning the engine off and/or causing the AV 1610 to come to a stop). In an embodiment, if at least one of the sensors' 1611*a*, 1611*b*, 1611*c* calibration error value exceeds the first calibration error threshold, the computer processors 1630 carry out operations to notify a remote technician. In an embodiment, if at least one of the sensors' 1611*a*, 1611*b*, 1611*c* calibration error value exceeds a third calibration error threshold, the computer processors 1630 carry out operations to navigate the vehicle to a service location (e.g., by updating the planning module 404 discussed earlier with reference to FIG. 4). In an embodiment, if at least one of the sensors' 1611*a*, 1611*b*, 1611*c* calibration error value exceeds the first calibration error threshold, the computer processors 1630 carry out operations to disable (e.g., depower) sensors with calibration error values exceeding the first calibration error threshold. The calibration error thresholds associated with each vehicle operation can be chosen based on safety, accuracy and efficiency considerations.

Figure 17:
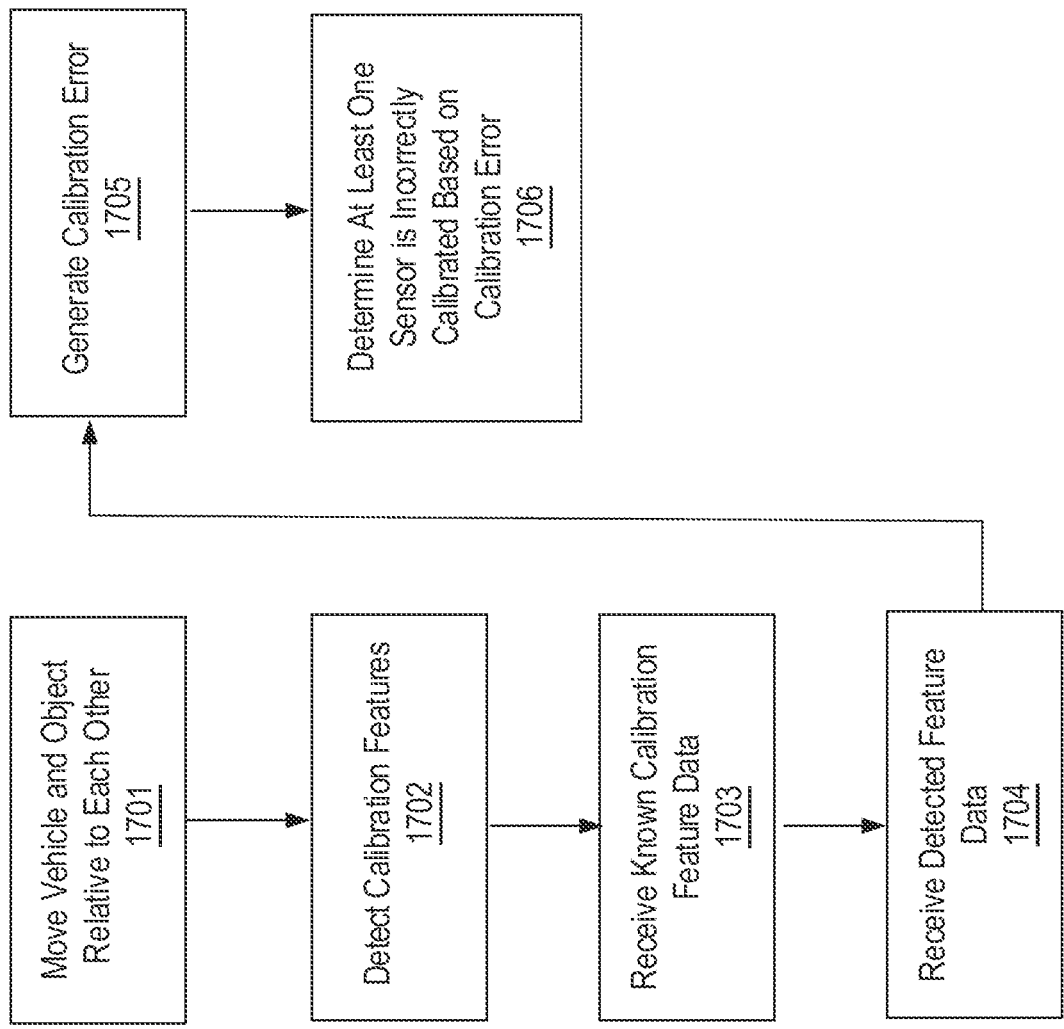
FIG. 17 is a flowchart depicting a method for calibrating sensors, in accordance with one or more embodiments of the present disclosure.

FIG. 17 is a flowchart depicting a method for calibrating sensors, in accordance with one or more embodiments of the present disclosure. For illustrative purposes, the method is described as being performed by the system in FIG. 16 for calibrating sensors discussed previously with reference to FIG. 16. However the method can be performed by other systems for calibrating sensors. The method includes moving a vehicle and object relative to each other (block 1701), detecting calibration features (block 1702), receiving known calibration feature data (block 1703), receiving detected feature data (block 1704), and generating calibration error (block 1705).

At block 1701, the object 1620 and the AV 1610 move with respect to each other. In an embodiment, the object 1620 is rotated around the AV 1610 while the AV 1610 remains stationary. In an embodiment, the object 1620 is stationary and the AV 1610 rotates around the object 1620. In an embodiment, the object 1620 is a stationary road fixture and the AV 1610 travels passed the object 1620. In an embodiment, the object 1620 has a spherical shape. In an embodiment, the object 1620 has a cubical shape. In an embodiment, the object 1620 has a cuboidal shape. In an embodiment, the object 1620 has a conical shape. The object 1320 can also have a toroidal shape, a triangular shape, a cylindrical shape, a pyramidal shape, and so forth. In an embodiment, the object 1620 is a ball. In an embodiment, the object 1620 is a cone. In an embodiment, the object 1620 is a cube. In an embodiment, the object 1620 includes three surfaces defining mutually perpendicular planes. The object 1620 can also be a road or building structure in the AV's 1610 environment. For example, in an embodiment, the object 1620 is a street sign. In an embodiment, the object 1620 is a billboard. In embodiment, the object 1620 is a building support beam (e.g., parking lot support beam). The object 1620 can also be naturally occurring in the AV's 1610 environment. For example, in an embodiment, the object 1620 is a tree. In an embodiment, the object 1620 is a large boulder. Although only one object 1620 is shown for illustrative purposes, the system in FIG. 16 can include additional objects, each additional object being one of several types (i.e., cube, support beam, tree, etc.).

At block 1702, the sensors 1611a, 1611b, 1611c detect at least one calibration feature of the object 1620 while the object 1620 and the AV 1610 move with respect to each other. As indicated earlier with reference to FIG. 16, the object 1620 can have at least one calibration feature. For example, in an embodiment, the object 1620 has at least one fixed printed patterns detectable by the sensors 1611a, 1611b, 1611c. In an embodiment, the object 1620 has a fixed location. In an embodiment, the object 1620 has a fixed distance from another object. In an embodiment, the object 1620 has a plurality of edges. In an embodiment, the object 1620 has an inner metal core having a size optimized for RADAR detection (e.g., optimized to reduce uncertainty) and an augmented portion which is detectable by LiDAR but substantially undetectable by RADAR (e.g., invisible RADAR foam, cardboard, etc.). Thus, the object 1620 can be detectable by RADAR and LiDAR, while decreasing the uncertainty of measurements from RADAR detection.

In an embodiment, the first sensor 1611a is a LiDAR, the second sensor 1611b is a stereo camera, the third sensor 1611c is a RADAR, and the object 1610 is a cuboidal structure having a printed pattern (i.e., calibration feature) on each of its surfaces. Each of the sensors 1611a, 1611b, 1611c are configured to detect the location of each printed pattern of the object 1620 as the object 1620 is rotated (e.g., by a person or machine) around the AV 1610. Each of the sensors 1611a, 1611b, 1611c generate several point clouds associated with the printed pattern as the object 1620 and the AV 1610 rotate with respect to each other. In an embodiment, the object 1610 is a stationary road sign and each of the sensors 1611a, 1611b, 1611c are configured to detect the center and/or edges (i.e., calibration feature) of the road sign, while generating several point clouds associated with the center and/or edges of the stationary road sign as the AV 1610 and the road sign move with respect to each other.

At block 1703, the computer processors 1630 receive known calibration feature data associated with the calibration features of the object 1620. The known calibration feature data can be received from several sources. For example, in an embodiment, the known calibration feature data is received from user input. In an embodiment, the known calibration feature data is received from the remotely located database 134, and corresponds to sensor data from a calibrated sensor remote from the AV 1610. For example, assume that the object 1620 is a street sign along a road. The computer processors 1630 can receive point cloud data associated with the location of the center of the street sign (or the corners of the street sign) that was generated by one or more remote sensors (e.g., sensors mounted on a second AV) from the remotely located database 134.

In an embodiment, the known calibration feature data is received from one of the sensors 1611a, 1611b, 1611c of the AV 1610 that is known to be the most accurate. For example, assume that the object 1620 is a cuboidal structure with printed patterns and that the first sensor 1611a is known to be the most accurate. In an embodiment, one of the sensors 1611a, 1611b, 1611c has been pre-calibrated, and the known calibration feature data is received from the pre-calibrated sensor. In an embodiment, known calibration feature data is received from one of the sensors 1611a, 1611b, 1611c based on the type of sensor. For example, if the first sensor 1611a is a LiDAR, it can be chosen to represent the known calibration feature data because it is may be more accurate at detecting objects positioned at longer ranges. The computer processors 1630 can receive, from the first sensor 1611, point cloud data associated with the location of the printed patterns. In an embodiment, the known calibration data is received from the remotely located database 134, and corresponds to sensor data from at least one of the sensors 1611a, 1611b, 1611c from a previous calibration process. For example, assume that one of the sensors 1611a, 1611b, 1611c was calibrated at an earlier time using a cuboidal structure with printed patterns. The point cloud data generated during the previous calibration process is stored in the remotely located database 134 (or the computer-readable medium 1631), and the computer processors 1630 receive this previously generated point cloud data from the remotely located database 134 (or the computer-readable medium 1631).

At block 1704, the computer processors 1630 receive, from the sensors 1611a, 1611b, 1611c, detected feature data associated with the calibration features of the object 1620. For example, in an embodiment, the object 1620 is a cuboidal structure with printed patterns, and the computer processors 1630 receive, from each of the sensors 1611a, 1611b, 1611c, point cloud data associated with the location of the printed patterns as the object 1620 and the AV 1610 moved with respect to each other. In an embodiment, the object 1620 is a street sign, and the computer processors 1630 receive, from each of the sensors 1611a, 1611b, 1611c, point cloud data associated with the location of the center and/or corners of the street sign as the street sign and the AV 1610 moved with respect to each other.

At block 1705, the computer processors generate a calibration error by comparing the known calibration feature data with the detected feature data received from each of the sensors 1611a, 1611b, 1611c. For example, in an embodiment, the received known feature data is point cloud data associated with the location of the center and/or corners of a street sign that was detected by a remote sensor as a second AV moved relative to the street sign (the remote sensor being mounted on the AV). The received detected feature data is point cloud data associated with the location of the center and/or corners of the same street sign that was detected by each of the sensors 1611a, 1611b, 1611c as the AV 1610 moved relative to the street sign. The computer processors 1630 compare the point cloud data from the remote sensor with the point cloud data from each of the sensors 1611a, 1611b, 1611c. In another embodiment, the received known feature data is point cloud data associated with the location of the printed patterns on a cuboidal structure which was generated by the first sensor 1611a, which was predetermined to be the most accurate sensor of the three sensors, as the cuboidal structure and the AV 1610 moved with respect to each other. The received detected feature data is point cloud data associated with the locations of the printed patterns on the same cuboidal structure, which was generated by the second and third sensors 1611b, 1611c, as the cuboidal structure and the AV 1610 moved with respect to each other. The computer processors 1630 compare the point cloud data generated by the first sensor 1611a with the point cloud data generated by the other sensors 1611b, 1611c.

After comparing the known calibration feature data with the received detected feature data, the computer processors 1630 generate, for each of the sensors 1611a, 1611b, 1611c, a calibration error value based on the comparison of the received known feature data with the received detected feature data from the sensors 1611a, 1611b, 1611c. For example, in an embodiment, the computer processors 1630 compare each point of the point clouds from the sensors 1611a, 1611b, 1611c to a corresponding point in the reference point cloud and calculates an error, for each sensor 1611a, 1611b, 1611c, based on the distances between them. Typically, smaller distances between each point of the point clouds generated by each of the sensors 1611a, 1611b, 1611c, and the corresponding points of the reference point cloud, will lead to smaller calculated errors. Errors can also be present if the reference point cloud encompasses more points than the point clouds associated with the detected feature data. For example, a LiDAR may generate more points in a point cloud than a camera when the object 1620 is located at a distance that is fully detectable by the LiDAR but may not be fully detectable by the camera in its current focal length setting.

At block 1706, the computer processors 1630 determine that one or more of the sensors 1611a, 1611b, 1611c are incorrectly calibrated when their corresponding calibration error value exceeds a first calibration error threshold. The first calibration error threshold can be selected based on, for example, accuracy, safety, and efficiency considerations. For example, in an embodiment, the computer processors 1630 determine one or more of the sensors 1611a, 1611b, 1611c are incorrectly calibrated when their corresponding calibration error value exceeds a 5% error. In an embodiment, the computer processors 1630 determine one or more of the sensors 1611a, 1611b, 1611c are incorrectly calibrated when each point of their corresponding point cloud is separated from a corresponding point in the reference point cloud by a distance exceeding 0.5 m.

Figure 18:
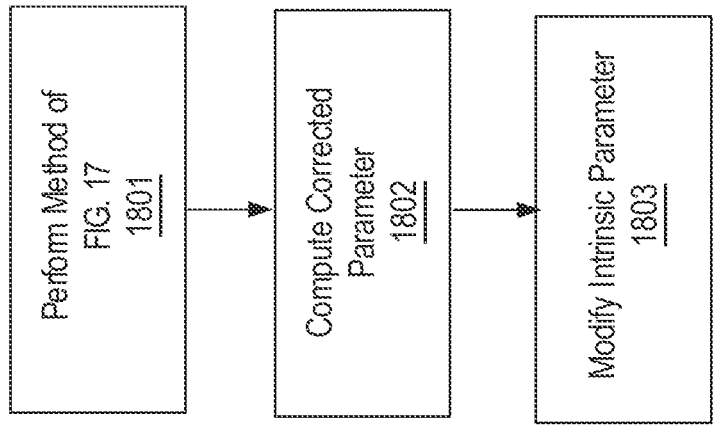
FIG. 18 is a flowchart depicting a method for modifying intrinsic parameters based on calibration error, according to one or more embodiments of the present disclosure.

FIG. 18 is a flowchart depicting a method for modifying intrinsic parameters based on calibration error, according to one or more embodiments of the present disclosure. For illustrative purposes, the method is described as being performed by the system in FIG. 16 for calibrating sensors discussed previously with reference to FIG. 16. However the method can be performed by other systems for calibrating sensors. The method includes performing the method in FIG. 17 for calibrating sensors as discussed previously with reference to FIG. 17 (block 1801). The method further includes computing a corrected parameter (block 1802) and modifying an intrinsic parameters (block 1803).

At block 1801, the method in FIG. 17 for calibrating sensors is performed to determine if one or more of the sensors 1611a, 1611b, 1611c are incorrectly calibrated.

At block 1802, the computer processors 1630 computer a corrected parameter for at least one intrinsic parameter for each of the sensors 1611a, 1611b, 1611c determined to be incorrectly calibrated. For example, in an embodiment, the computer processors 1630 determine, based on the calibration error value, that the incorrectly calibrated sensor should increase its beam power such that detection accuracy will increase. In an embodiment, the first sensor 1611a is the reference sensor and is a LiDAR, and the second sensor 1611b is a camera. If the computer processors 1630 determine that the calibration error was due to the object 1620 being too far away for the second sensor 1611b to detect in its current state, and therefore leading to less points in the point cloud with respect to the first sensor's 1611 point cloud, the computer processors 1630 determines that the focal length of the second sensor 1611b needs to be adjusted such that it aligns with the first sensor's 1611a detection range.

As previously indicated the sensors 1611a, 1611b, 1611c can include monitoring devices configured to detect one or more intrinsic parameters of the sensors 1611a, 1611b, 1611c. In an embodiment, the computer processors 1630 receive intrinsic data associated with the one or more intrinsic parameters of the sensors 1611a, 1611b, 1611c and compute the corrected parameters based on the received intrinsic data. For example, in an embodiment, the second sensor 1611b is a LiDAR and includes a temperature sensor and an electromagnetic wave sensor. The computer processors 1630 receive the current operating temperature and the current beam power settings from the monitoring devices of the second sensor 1611b. If the computer processors 1630 determine that the second sensor 1611b is incorrectly calibrated and needs to increase its beam power (which can increase the operating temperature of the second sensor 1611b), the computer processors 1630 can compute an increased beam power based on the received intrinsic data such that the increase in beam power does not overheat the second sensor 1611b.

At block 1803, the computer processors 1630 modify the one or more sensors 1611a, 1611b, 1611c determined to be incorrectly calibrated in accordance with the computed corrected parameter. For example, if the computer processors 1630 compute an increased beam power for the second sensor 1611b, it can modify the beam power of the second sensor 1611b by using, for example, the second sensor's 1611b beam power adjustment system. If the computer processors 1630 compute an increased focal length for the third sensor 1611c, it can modify the focal length of the second sensor 1611c by, for example, adjusting at least one lens of the third sensor 1611c.

FIG. 19 is a flowchart depicting a method for determining sensor failure based on calibration error, according to one or more embodiments of the present disclosure. For illustrative purposes, the method is described as being performed by the system in FIG. 16 for calibrating sensors discussed previously with reference to FIG. 16. However the method can be performed by other systems for calibrating sensors. The method includes performing the method in FIG. 17 for calibrating sensors as discussed earlier with reference to FIG. 17 (block 1901). The method also includes determining sensor failure based on calibration error (block 1902), performing a vehicle operation based on calibration error (block 1903), and computing corrected parameter for an extrinsic parameter (block 1904).

At block 1901, the method for calibrating sensors is performed to determine if one or more of the sensors 1611a, 1611b, 1611c are incorrectly calibrated.

At block 1902, the computer processors 1630 further carry out operations to determine that one or more of the sensors 1611a, 1611b, 1611c determined to be incorrectly calibrated is in a failure state when their corresponding calibration error value exceeds a second calibration error threshold. For example, assume that each point of the point cloud associated with the detected feature data received from the second sensor 1611b is separated from corresponding points in the reference point cloud by a distance of 5 meters. In an embodiment, the second calibration error threshold is 4 meters, and the computer processors 1630 determine that the second sensor 1611b is in a failure state. As another example, the third sensor 1611b may not generate the same amount of points in its point cloud as the reference point cloud with respect to the object 1620, causing a 20% error. If the second calibration error threshold is 15%, the computer processors 1630 can determine that the third sensor 1611b is in a failure state. A failure state can indicate that a sensor has been physically knocked out of alignment, a sensor is operating in environmental conditions that are not conducive for detection (e.g., a camera operating in highly foggy conditions), a sensor's aperture has become too dirty for detection, and so forth. In an embodiment, the second calibration threshold is greater than the first calibration error threshold. The second calibration error threshold can be chosen based on, for example, accuracy, safety, and efficiency considerations. In an embodiment, the second calibration error threshold is chosen to reflect errors that cannot be sufficiently fixed, with respect to safety considerations, by tuning intrinsic parameters.

At block 1903, the computer processors 1630 further carry out operations to cause one or more vehicle operations when at least one of the sensors' 1611*a*, 1611*b*, 1611*c* calibration error value exceeds a calibration error threshold. For example, in an embodiment, if at least one of the sensors' 1611*a*, 1611*b*, 1611*c* calibration error value exceeds the second calibration error threshold, the computer processors 1630 causes the AV 1610 to cease operation (e.g., by turning the engine off and/or causing the AV 1610 to come to a stop). In an embodiment, if at least one of the sensors' 1611*a*, 1611*b*, 1611*c* calibration error value exceeds the first calibration error threshold, the computer processors 1630 carry out operations to notify a remote technician. In an embodiment, if at least one of the sensors' 1611*a*, 1611*b*, 1611*c* calibration error value exceeds a third calibration error threshold, the computer processors 1630 carry out operations to navigate the vehicle to a service location (e.g., by updating the planning module 404 discussed earlier with reference to FIG. 4). In an embodiment, if at least one of the sensors' 1611*a*, 1611*b*, 1611*c* calibration error value exceeds the first calibration error threshold, the computer processors 1630 carry out operations to disable (e.g., depower) sensors with calibration error values exceeding the first calibration error threshold. The calibration error thresholds associated with each vehicle operation can be chosen based on safety, accuracy and efficiency considerations.

At block 1904, the computer processors 1630 carry out operations to compute a corrected parameter for at least one extrinsic parameter associated with the sensors 1611*a*, 1611*b*, 1611*c* determined to be in a failure state. For example, assume that the first sensor 1611*a* is determined to be in a failure state because its point cloud was unaligned with the reference point cloud such that a 20% calibration error value was calculated. In an embodiment, the computer processors 1630 determine that, based on the calibration error value, the first sensor's 1611*a* tilt angle should be adjusted in order to align its point cloud with the reference point cloud.

Additional Embodiments

In an embodiment, a system includes a vehicle and at least one object including at least one calibration feature. The vehicle includes sensors configured to detect the at least one calibration feature of the at least one object while the at least one object and the vehicle move relative to each other. Each sensor has multiple parameters. The parameters include intrinsic parameters and extrinsic parameters. A computer-readable medium stores computer-executable instructions. At least one processor is configured to be communicatively coupled to the sensors and execute the instructions stored on the computer-readable medium. The at least one processor executes the instructions and carries out operations to receive known calibration feature data associated with the at least one calibration feature. From each sensor, detected feature data associated with the at least one calibration feature is received. The received known feature data is compared to the received detected feature data. For each sensor, a calibration error value is generated based on the comparison of the received known feature data with the received detected feature data. It is determined that at least one sensor is incorrectly calibrated when the calibration error value corresponding with the at least one sensor is greater than a first calibration error threshold.

In an embodiment, the sensors include a first sensor having a first type and a second sensor having a second type.

In an embodiment, the sensors include at least one RADAR sensor, and the least one object includes an inner metal core detectable by the at least one RADAR sensor.

In an embodiment, the sensors include at least one light detection and ranging sensor and at least one RADAR sensor. The at least one object includes an augmented portion. The augmented portion is substantially detectable by the at least one light detection and ranging sensor and substantially undetectable by the at least one RADAR sensor.

In an embodiment, the known feature data includes at least one of information received from a remote sensor, information received from another vehicle, information received from the one or more sensors at a prior time, or information determined by a pre-calibrated sensor of the one or more sensor.

In an embodiment, the known feature data includes information received from a remote sensor mounted on a second vehicle.

In an embodiment, the known feature data includes information received from a sensor of a first type and the sensors include at least one sensor of a second type being different from the first type.

In an embodiment, the at least one processor executes the instructions. The at least one processor carries out operations to cause the vehicle to cease operation if the calibration error value corresponding with the at least one sensor determined to be incorrectly calibrated is greater than a calibration error threshold.

In an embodiment, the at least one processor executes the instructions. The at least one processor carries out operations to notify a remote technician if the calibration error value corresponding with the at least one sensor determined to be incorrectly calibrated is greater than a calibration error threshold.

In an embodiment, the at least one processor executes the instructions. The at least one processor carries out operations to navigate the vehicle to a service location if the calibration error value corresponding with the at least one sensor determined to be incorrectly calibrated is greater than a calibration error threshold.

In an embodiment, the at least one processor executes the instructions. The at least one processor carries out operations to disable the at least one sensor determined to be incorrectly calibrated if the calibration error value corresponding with the at least one sensor is greater than a calibration error threshold.

In an embodiment, a method includes moving a vehicle and at least one object relative to each other. The vehicle includes sensors and the at least one object includes at least one calibration feature. The sensors detect the at least one calibration feature of the at least one object while the at least one object and the vehicle are moving relative to each other. Each sensor includes parameters including intrinsic parameters and extrinsic parameters. Known calibration feature data associated with the at least one calibration feature is received. From each sensor, detected feature data associated with the at least one calibration feature is received. The received known feature data is compared with the received detected feature data. For each sensor, a calibration error value based on the comparison of the received known feature data with the received detected feature data is generated. It is determines that at least one sensor is incorrectly calibrated when the calibration error value corresponding with the at least one sensor is greater than a first calibration error threshold.

In an embodiment, a corrected parameter is computed for at least one intrinsic parameter associated with the at least one sensor determined to be incorrectly calibrated. Computing the corrected parameter is at least partially based on the determining that the at least one sensor is incorrectly calibrated.

In an embodiment, the at least one intrinsic parameter is modified based on the corrected parameter.

In an embodiment, each of the sensors includes one or more monitoring devices configured to detect intrinsic data corresponding with at least one intrinsic parameter. The intrinsic data associated with the at least one intrinsic parameter is received. A corrected parameter is computed for the at least one intrinsic parameter of the at least one sensor determined to be incorrectly calibrated at least partially based on the received intrinsic data.

In an embodiment, it is determined that the at least one sensor determined to be incorrectly calibrated is in a failure state when the calibration error value corresponding with the at least one sensor is greater than a second calibration error threshold.

In an embodiment, a corrected parameter is computed for at least one extrinsic parameter associated with the at least one sensor determined to be incorrectly calibrated. Computing the corrected parameter for the at least one extrinsic parameter is at least partially based on the determining that the at least one sensor is in a failure state.

In an embodiment, the at least one object includes three surfaces defining three mutually perpendicular planes. Each surface of the three surfaces includes at least one calibration feature.

In an embodiment, the at least one object includes a fixed road feature.

In an embodiment, the sensors include at least one RADAR sensor, and the least one object includes an inner metal core being detectable by the at least one RADAR sensor.

In an embodiment, the sensors include at least one light detection and ranging sensor and at least one RADAR sensor. The at least one object includes an augmented portion. The augmented portion is substantially detectable by the at least one light detection and ranging sensor and substantially undetectable by the at least one RADAR sensor.

In an embodiment, the known feature data includes at least one of information received from a remote sensor, information received from another vehicle, information received from the one or more sensors at a prior time, or information determined by a pre-calibrated sensor of the one or more sensors.

In an embodiment, the vehicle is caused to cease operation if the calibration error value corresponding with the at least one sensor determined to be incorrectly calibrated is greater than a calibration error threshold.

In an embodiment, a remote technician is notified if the calibration error value corresponding with the at least one sensor determined to be incorrectly calibrated is greater than a calibration error threshold.

In an embodiment, the vehicle is navigated to a service location if the calibration error value corresponding with the at least one sensor determined to be incorrectly calibrated is greater than a calibration error threshold.

In an embodiment, the at least one sensor is disabled if the calibration error value corresponding with the at least one sensor determined to be incorrectly calibrated is greater than a calibration error threshold.

In an embodiment, the known feature data includes information received from a remote sensor mounted on a second vehicle.

In an embodiment, the known feature data includes information received from a sensor of a first type and the sensors include at least one sensor of a second type being different from the first type.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one light detection and ranging sensor configured to detect a distance to at least one location associated with a substantially reflective portion of at least one object;
   at least one imaging sensor configured to detect light intensity values associated with the substantially reflective portion of the at least one location of the at least one object;
   a computer-readable medium storing computer-executable instructions; and
   at least one processor communicatively coupled to the at least one light detection and ranging sensor and the at least one imaging sensor and configured to execute the computer-executable instructions stored on the computer-readable medium, wherein when the at least one processor executes the instructions, the at least one processor carries out operations to:
   receive sensor data associated with the detected distance to the at least one location;
   generate a first predicted aggregate location associated with the substantially reflective portion based on the sensor data associated with the detected distance to the at least one location,
   receive sensor data associated with the detected intensity values of the at least one location,
   generate a second predicted aggregate location associated with the reflective portion based on the sensor data associated with the detected intensity values of the at least one location; and
   determine an alignment error value based on the first predicted aggregate location and the second predicted aggregate location.

2. The system of claim 1, wherein the computer-executable instructions comprise a first algorithm for generating the first predicted aggregate location and a second algorithm for generating the second predicted aggregate location, the second algorithm being different from the first algorithm, wherein at least one of the first algorithm and the second algorithm is modified when the alignment error value is greater than a first alignment error threshold.

3. The system of claim 2, wherein at least one of the first algorithm and the second algorithm is modified such that the generated first predicted aggregate location and the generated second predicted aggregate location are substantially aligned.

4. The system of claim 1, wherein when the at least one processor executes the instructions, the at least one processor carries out operations to initiate a calibration process of the at least one image capture sensor or the at least one light detection and ranging sensor when the alignment error is more than a second alignment error threshold.

5. The system of claim 1, wherein the at least one object is further configured to have a substantially non-reflective portion.

6. The system of claim 1, wherein the substantially reflective portion comprises at least one of a substantially black surface or a substantially white surface.

7. A method comprising:
receiving, with at least one processor, sensor data associated with a detected distance to at least one location from a first sensor, wherein the detected distance is to at least one location associated with a substantially reflective portion of at least one object;
generating, with the at least one processor, a first predicted aggregate location associated with the substantially reflective portion based on the sensor data associated with the detected distance to the at least one location;
receiving, with the at least one processor, sensor data associated with detected intensity values of the at least one location, wherein the detected intensity values are light intensity values at the at least one location associated with the substantially reflective portion of the at least one object;
generating, with the at least one processor, a second predicted aggregate location associated with the reflective potion based on the sensor data associated with the detected intensity values of the at least one location; and
determining, with the at least one processor, an alignment error value based on the first predicted aggregate location and the second predicted aggregate location.

8. The method of claim 7, wherein the first predicted aggregate location is generated using a first algorithm and the second predicted aggregate location is generated using a second algorithm, the method further comprising modifying at least one of the first algorithm and the second algorithm when the alignment error value is greater than a first alignment error threshold.

9. The method of claim 8, further comprising modifying at least one of the first algorithm and the second algorithm such that the generated first predicted aggregate location and the generated second predicted aggregate location are substantially aligned.

10. The method of claim 7, comprising calibrating at least one of the at least one image capture sensor and the at least one light detection and ranging sensor when the alignment error is more than a second alignment threshold.

11. The method of claim 7, wherein the sensor data associated with the detected distance is LiDAR data.

12. The method of claim 7, wherein the sensor data associated with the detected distance is radar data.

13. The method of claim 7, wherein the sensor data associated with the detected intensity values is camera data.

14. The method of claim 7, comprising initiating a calibration process when the alignment error value is greater than a predetermined threshold, wherein the calibration process comprises computing a corrected parameter for at least one intrinsic parameter associated with the first sensor or the second sensor.

15. At least one non-transitory storage media storing instructions that, when executed by at least one processor, cause the at least one processor to:
receive sensor data associated with a detected distance to at least one location from a first sensor, wherein the detected distance is to at least one location associated with a substantially reflective portion of at least one object;
generate a first predicted aggregate location associated with the substantially reflective portion based on the sensor data associated with the detected distance to the at least one location;
receive sensor data associated with detected intensity values of the at least one location, wherein the detected intensity values are light intensity values at the at least one location associated with the substantially reflective portion of the at least one object;
generate a second predicted aggregate location associated with the reflective potion based on the sensor data associated with the detected intensity values of the at least one location; and
determine an alignment error value based on the first predicted aggregate location and the second predicted aggregate location.

16. The at least one non-transitory storage media of claim 15, wherein the first predicted aggregate location is generated using a first algorithm and the second predicted aggregate location is generated using a second algorithm, the method further comprising modifying at least one of the first algorithm and the second algorithm when the alignment error value is greater than a first alignment error threshold.

17. The at least one non-transitory storage media of claim 16, further comprising modifying at least one of the first algorithm and the second algorithm such that the generated first predicted aggregate location and the generated second predicted aggregate location are substantially aligned.

18. The at least one non-transitory storage media of claim 15, wherein the sensor data associated with the detected distance is LiDAR data.

19. The at least one non-transitory storage media of claim 15, wherein the sensor data associated with the detected intensity values is camera data.

20. The at least one non-transitory storage media of claim 15, comprising initiating a calibration process when the alignment error value is greater than a predetermined threshold, wherein the calibration process comprises computing a corrected parameter for at least one intrinsic parameter associated with the first sensor or the second sensor.

* * * * *